United States Patent [19]
Hamada

[11] Patent Number: 4,880,299
[45] Date of Patent: Nov. 14, 1989

[54] TELECENTRIC Fθ LENS SYSTEM FOR LASER COM
[75] Inventor: Akiyoshi Hamada, Toyokawa, Japan
[73] Assignee: Minolta Camera Kabushiki Kaisha, Osaka, Japan
[21] Appl. No.: 216,509
[22] Filed: Jul. 7, 1988

Related U.S. Application Data
[63] Continuation of Ser. No. 43,645, Apr. 28, 1987, abandoned.

[30] Foreign Application Priority Data
Apr. 28, 1986 [JP] Japan ................................ 61-99065
Apr. 28, 1986 [JP] Japan ................................ 61-99066
[51] Int. Cl.$^4$ ........................ G02B 13/22; G02B 9/62; G02B 9/64
[52] U.S. Cl. ................................................. 350/415
[58] Field of Search ...................................... 35 D/415

[56] References Cited
U.S. PATENT DOCUMENTS
3,750,189  7/1973  Fleischer .
4,518,228  5/1985  Sugiura .
4,637,690  1/1987  Miyamae et al. .

FOREIGN PATENT DOCUMENTS
54-29265    9/1979  Japan .
54-126051   9/1979  Japan .
56-13921    4/1981  Japan .
57-10575    7/1982  Japan .
60-52409   11/1985  Japan .

Primary Examiner—Bruce Y. Arnold
Assistant Examiner—Rebecca D. Gass
Attorney, Agent, or Firm—Price, Gess & Ubell

[57] ABSTRACT

A telecentric fθ lens system for use in a laser COM comprising, from the object field side, a first lens unit including at least one negative lens component for generating a large negative distortion, a second lens unit consisting of one or two positive lens components for compensating spherical aberration and astigmatism generated by the first lens unit, a third lens unit including at least one positive lens component for providing a telecentric characteristic and a fourth lens unit including three or four lens components for providing a small F number.

33 Claims, 28 Drawing Sheets

SPHERICAL ABERRATION

ASTIGMATISM

DISTORTION

SPHERICAL ABERRATION

ASTIGMATISM

DISTORTION

SPHERICAL ABERRATION

ASTIGMATISM

DISTORTION

SPHERICAL ABERRATION     ASTIGMATISM     DISTORTION

SPHERICAL
ABERRATION

ASTIGMATISM

DISTORTION

SPHERICAL ABERRATION    ASTIGMATISM    DISTORTION

SPHERICAL ABERRATION | ASTIGMATISM | DISTORTION

SPHERICAL
ABERRATION    ASTIGMATISM    DISTORTION

SPHERICAL
ABERRATION   ASTIGMATISM   DISTORTION

SPHERICAL ABERRATION   ASTIGMATISM   DISTORTION

TELECENTRIC Fθ LENS SYSTEM FOR LASER COM

This is a continuation of application Ser. No. 043,645, filed Apr. 28, 1987, now abandoned.

FIELD OF THE INVENTION

The present invention relates to a telecentric fθ lens system for a laser COM (Computer Output Microfilm) system, and more particularly to a telecentric fθ lens system having a tilting correction function therein or being capable of combination with a tilting correction lens unit.

BACKGROUND OF THE INVENTION

In laser scanning optics, a polygonal mirror or the like is used for scanning the laser beam. High speed rotation of the polygonal mirror causes the tilting of the deflecting or reflecting surface thereof and results in irregularity in the pitch of the scanning lines on a scanned surface. For eliminating the irregularity mentioned above, U.S. Pat. No. 3,750,189 has proposed an optical system for a laser printer in which the laser beam to be incident on the deflecting surface is formed in a line image and is restored after the deflection.

In the meantime, a laser COM system, in which microfilms are exposed by a laser beam modulated in accordance with data from a computer through an optical system including a polygonal mirror and fθ lens system, requires high dot density such as 9600 dots/inch for the recording on the microfilm of 15 mm in width. The high dot density requirement leads in an optical system with a short focal length of about 50 mm. The conventional optical systems with the tilting correction function for use in laser printers can not be adapted to the laser COM system since these optical systems have a long focal length, for example, 200 mm to 300 mm.

The high dot density requirement may be fulfilled by an optical system having a scanning lens system (fθ lens) and a reduction lens system which projects reduced images. However, this optical system has a drawback of large size.

Furthermore, a laser COM system for a high dot density recording requires a large aperture ratio for the optical system used therein to the extent of FNo.=3.

Japanese Laid-Open Patent Application No. 57-105715 discloses a telecentric fθ lens system with FNo.=3 for use in a laser COM system. However, the disclosed telecentric fθ lens system has no tilting correction function and can not be combined with the conventional tilting correction optics, because no space extends between the deflecting surface and the recording surface. The telecentric lens system, in which parallel light rays are emitted if the light rays come into the lens system from the focal point thereof, is thought to be suitable for the laser COM.

SUMMARY OF THE INVENTION

Accordingly, an object of the present invention is to provide an improved telecentric fθ lens system for use in a laser COM of a high dot density recording.

Another object of the present invention is to provide a telecentric fθ lens system for use in a laser COM of high dot density recording and being compact in size.

Still another object of the present invention is to provide a telecentric fθ lens system for use in a laser COM of a high dot density recording and having a small F number.

Still another object of the present invention is to provide a telecentric fθ lens system for use in a laser COM, being compact in size and having small F number.

Still another object of the present invention is to provide a telecentric fθ lens system for use in a laser COM of a high dot density recording and being capable of combination with a tilting correction lens system.

Still another object of the present invention is to provide a telecentric fθ lens system for use in a laser COM of a high dot density recording and having a tilting correction function therein.

These and other objects of the present invention can be fulfilled by a telecentric fθ lens system for use in a laser COM comprising, from the object field side, a first lens unit includng at least one negative lens component for generating large negative distortion to guarantee proper fθ characteristic, a second lens unit consisting of one or two positive lens component for compensating any spherical aberration and astigmatism generated by the first lens unit, a third lens unit including at least one positive lens component for providing a telecentric characteristic, and a fourth lens unit including three or four lens components for providing a small F number.

The telecentric fθ lens system of the present invention mentioned above can be used in combination with a polygonal mirror with a low accuracy of rotatation and a tilting correction lens system which includes a first cylindrical lens disposed between a laser beam source and a polygonal mirror and a second cylindrical lens disposed between the telecentric fθ lens system and the recording surface, or in combination with a polygonal mirror with a high accuracy of rotation.

Further, the above mentioned telecentric fθ lens system of the present invention can be constructed to suit a telecentric fθ lens system with an additional tilting correction function added by some modification, namely adding a fifth lens unit of an anamorphic characteristic in which a refractive power in the sagittal direction is larger than that in the meridional direction and putting the lens surface of the third and/or fourth lens unit in an anamorphic surface.

The features of the present invention which are believed to be novel are set forth with particularity in the appended claims. The present invention, both as to its organization and advantages thereof, may best be understood by reference to the following description.

BRIEF DESCRIPTION OF THE DRAWINGS

FIGS. 2a to 17a are diagrams in section showing the telecentric fθ lens system of the first to sixteenth embodiments;

FIGS. 2b to 17b are diagrams showing aberration curves of the first to sixteenth embodiments;

FIGS. 19a to 30a are diagrams in meridional section showing the telecentric fθ lens system of the seventeenth to twenty-eighth embodiments;

FIGS. 19b to 30b are diagrams in sagittal section showing the telecentric fθ lens system of the seventeenth to twenty-eighth embodiments; and FIGS. 19c to 30c are diagrams showing aberration curves of the seventeenth to twenty-eighth embodiments.

DESCRIPTION OF THE PREFERRED EMBODIMENTS

Figure 1:
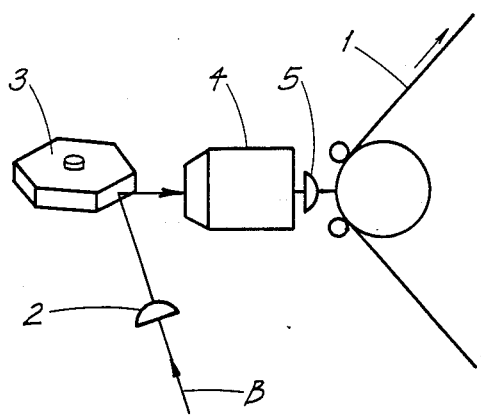
FIG. 1 is a diagram schematically showing a laser COM in which a first to sixteenth embodiment are to be used.
Figure 2A:
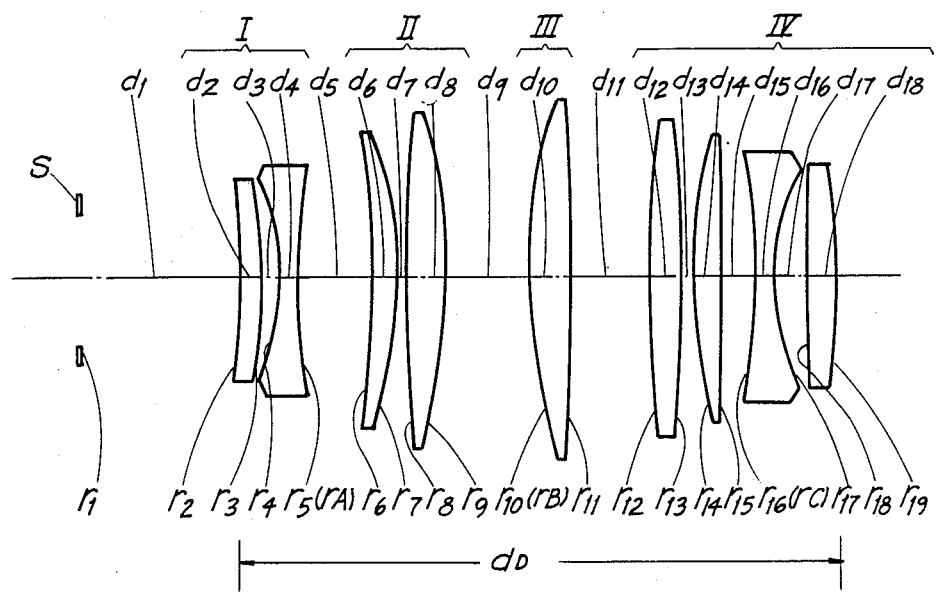
Figure 2B:
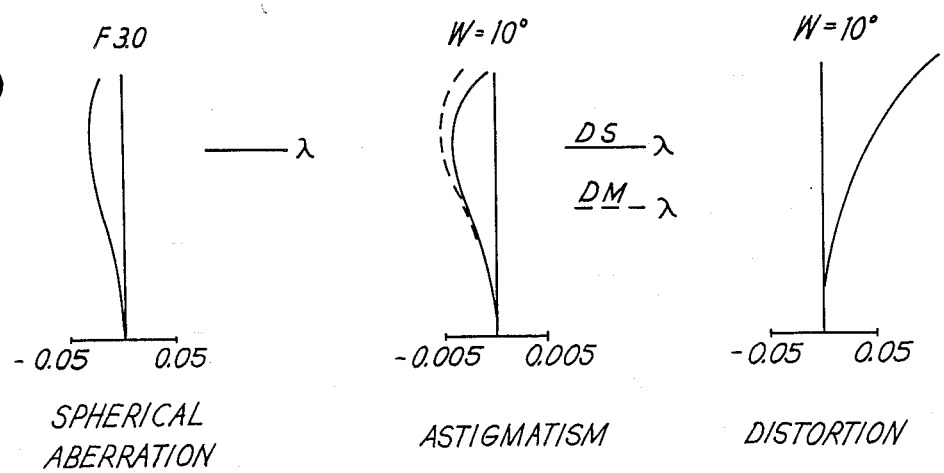
Figure 3A:
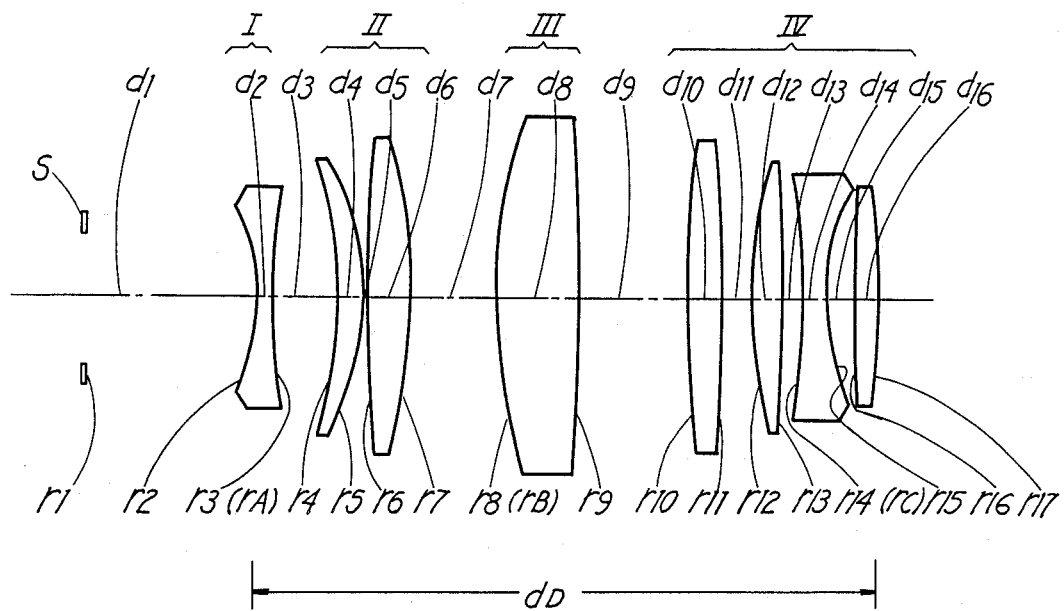
Figure 3B:
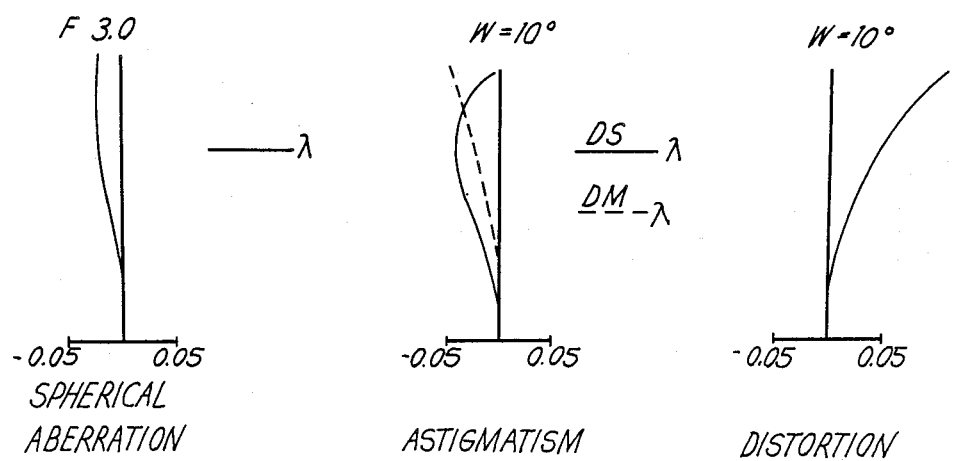
Figure 4A:
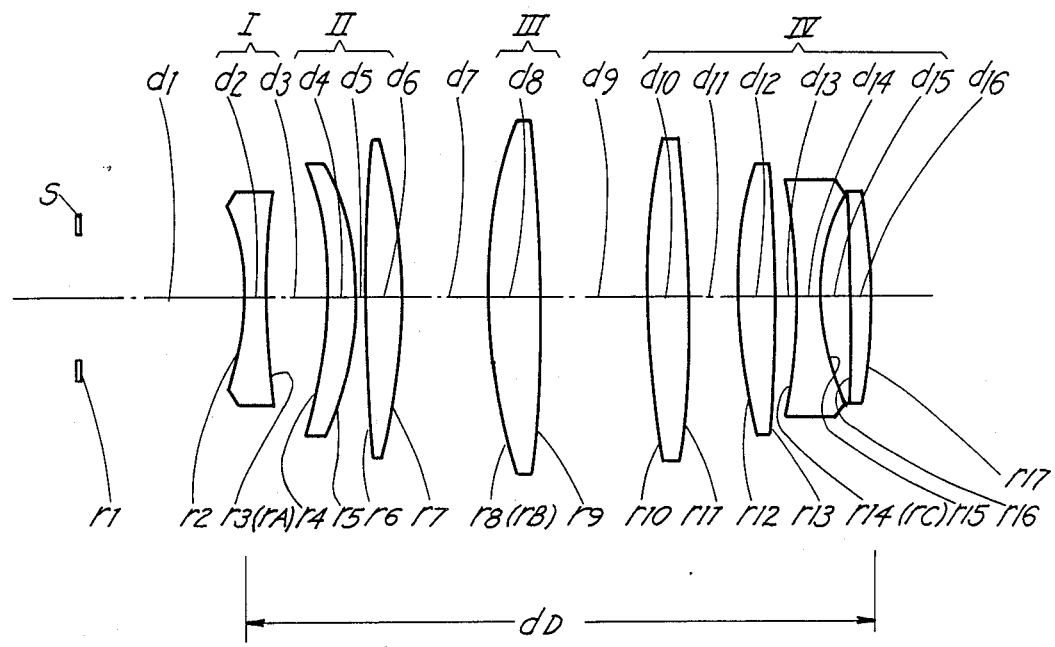
Figure 4B:
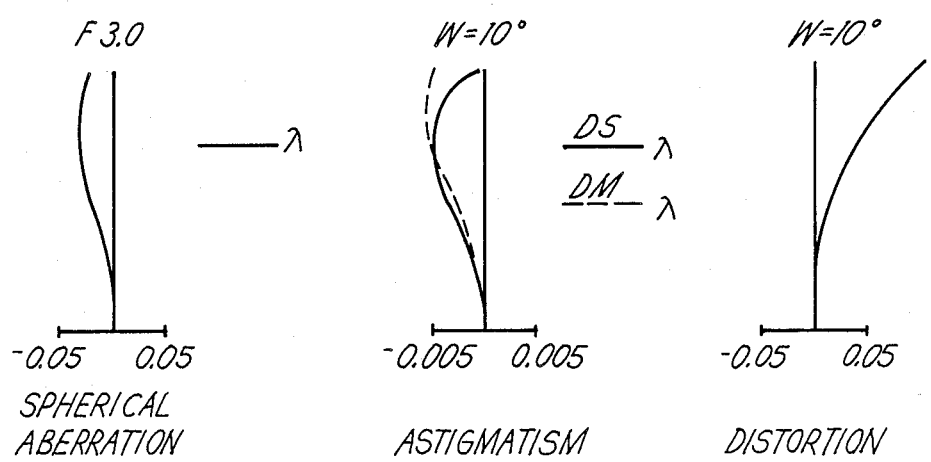
Figure 5A:
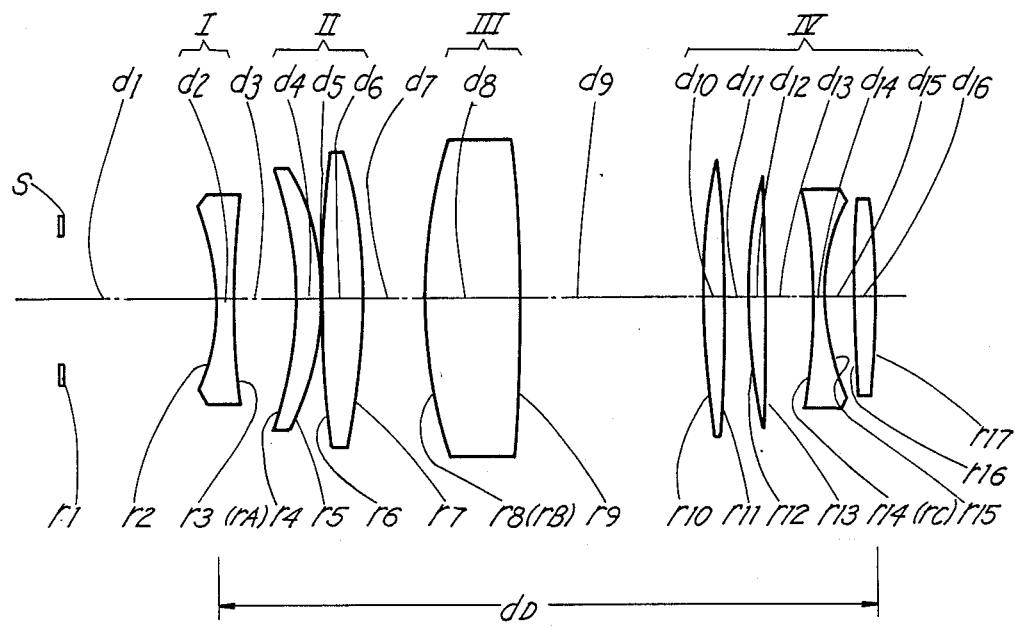
Figure 5B:
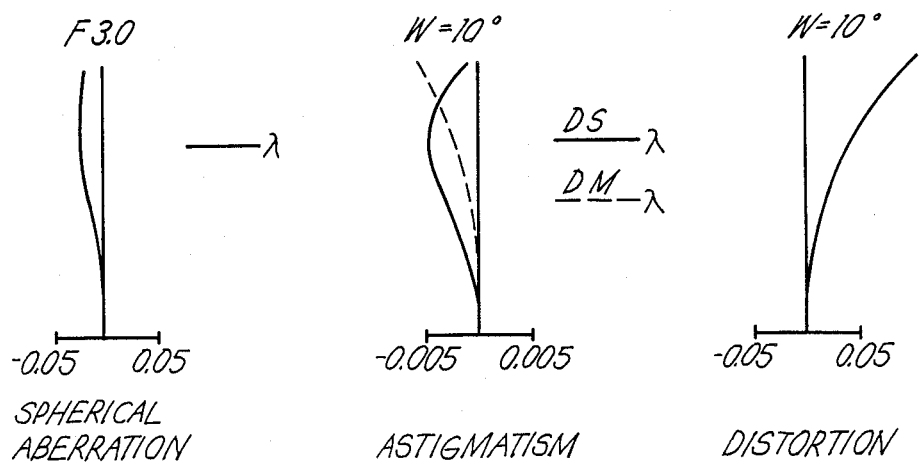
Figure 6A:
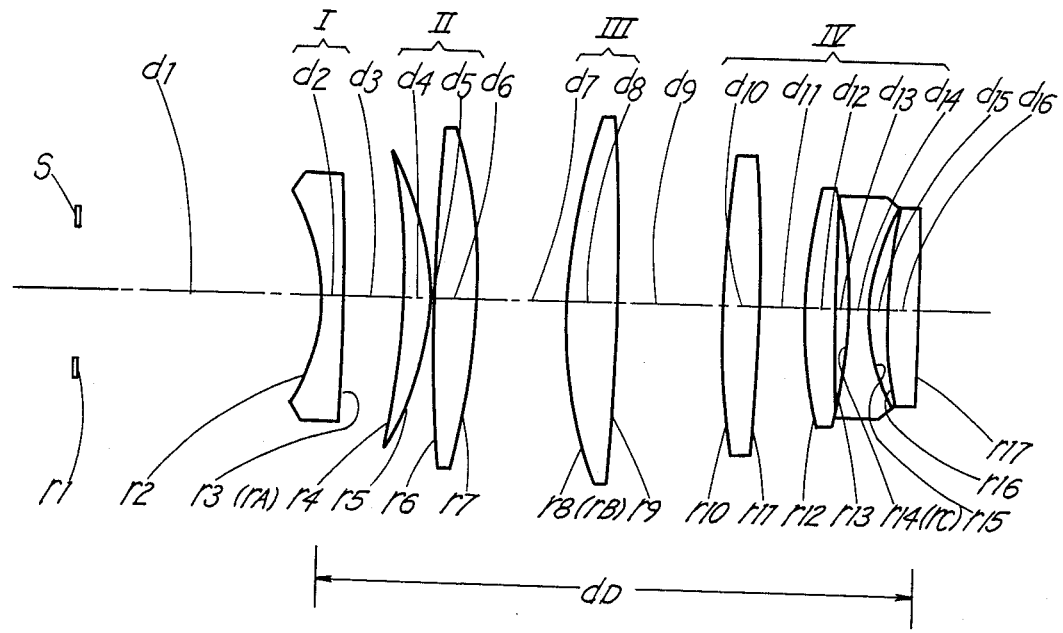
Figure 6B:
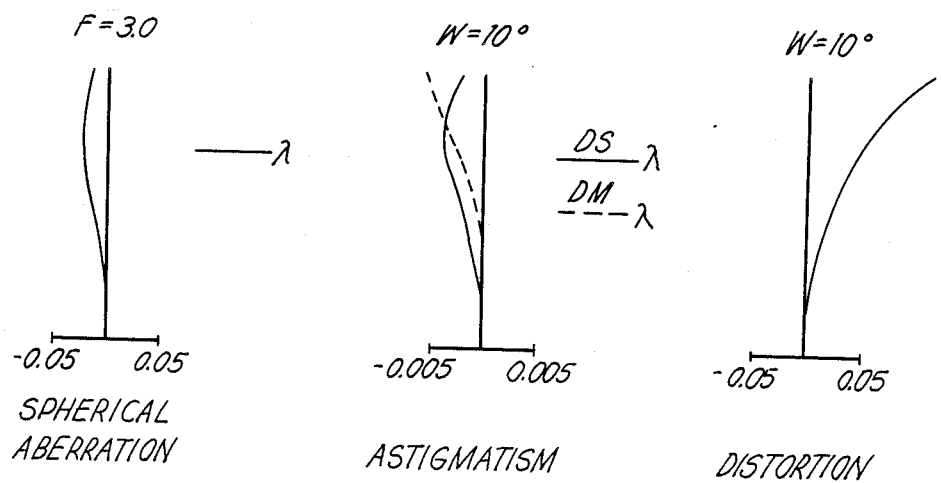
Figure 7A:
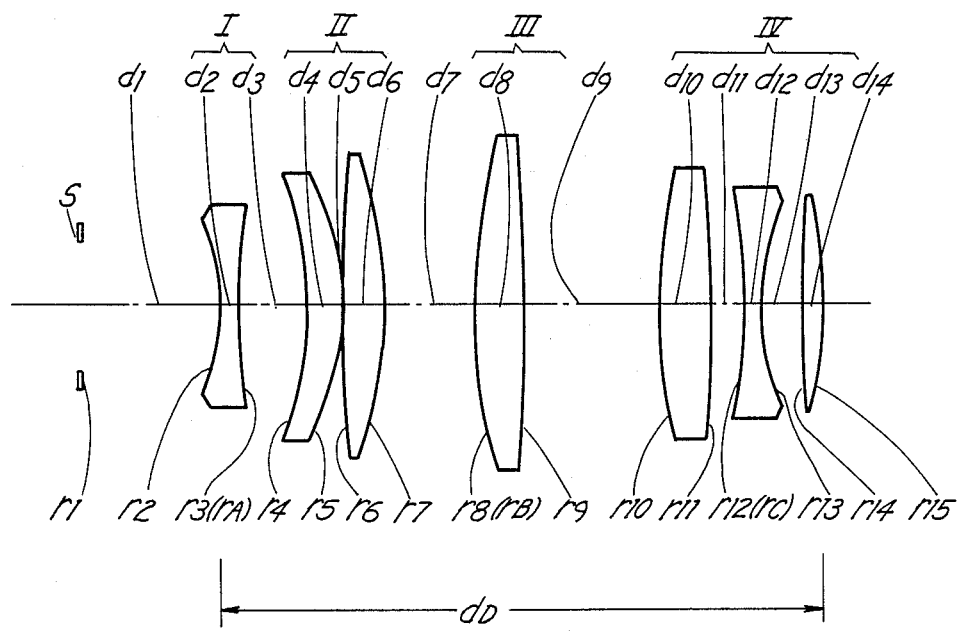
Figure 7B:
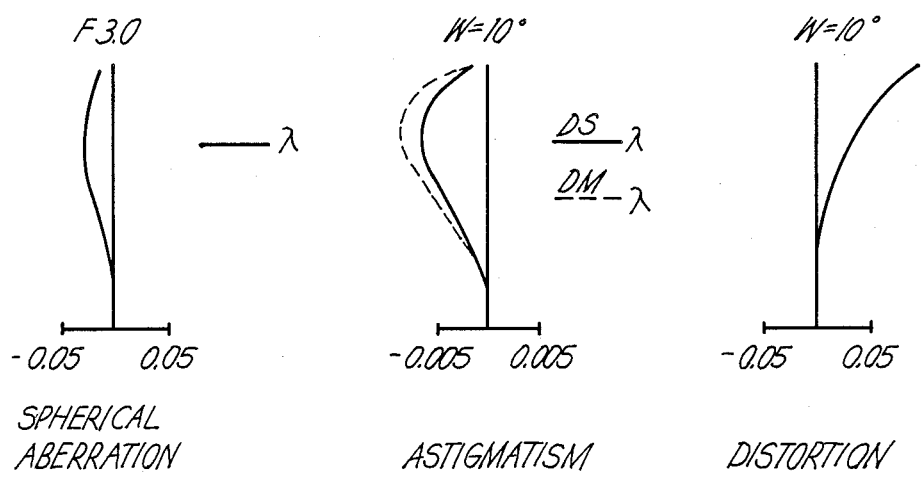
Figure 8A:
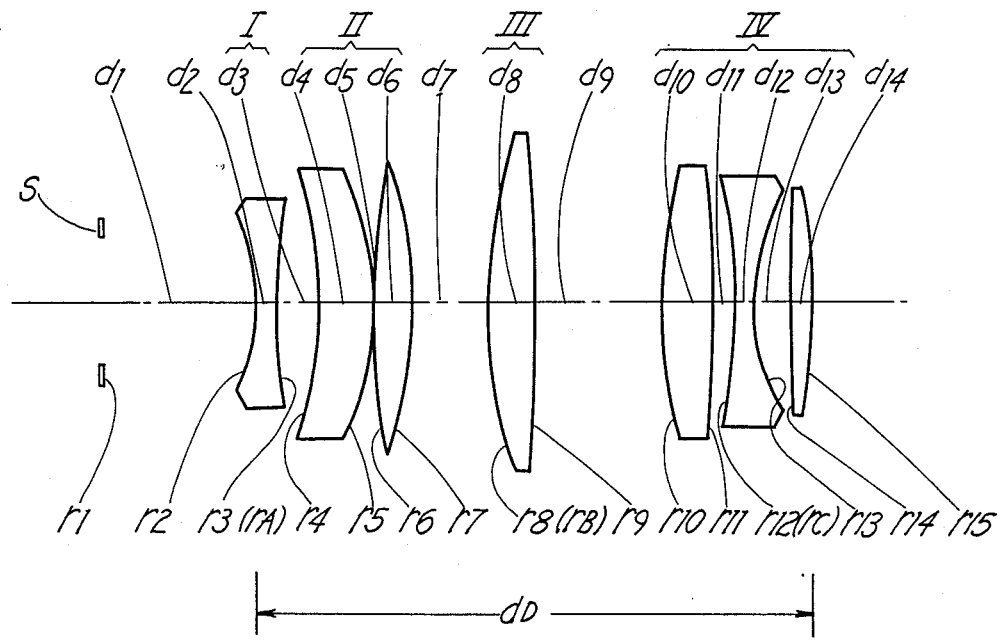
Figure 8B:
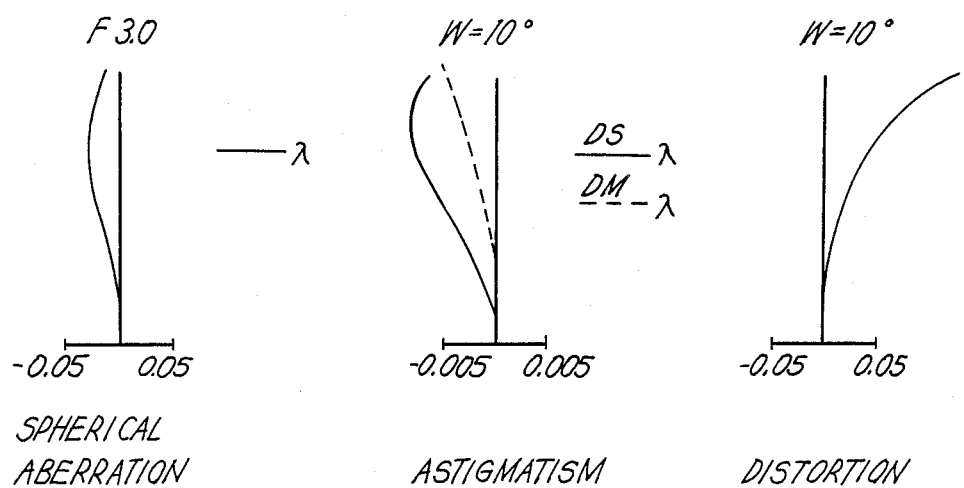
Figure 9A:
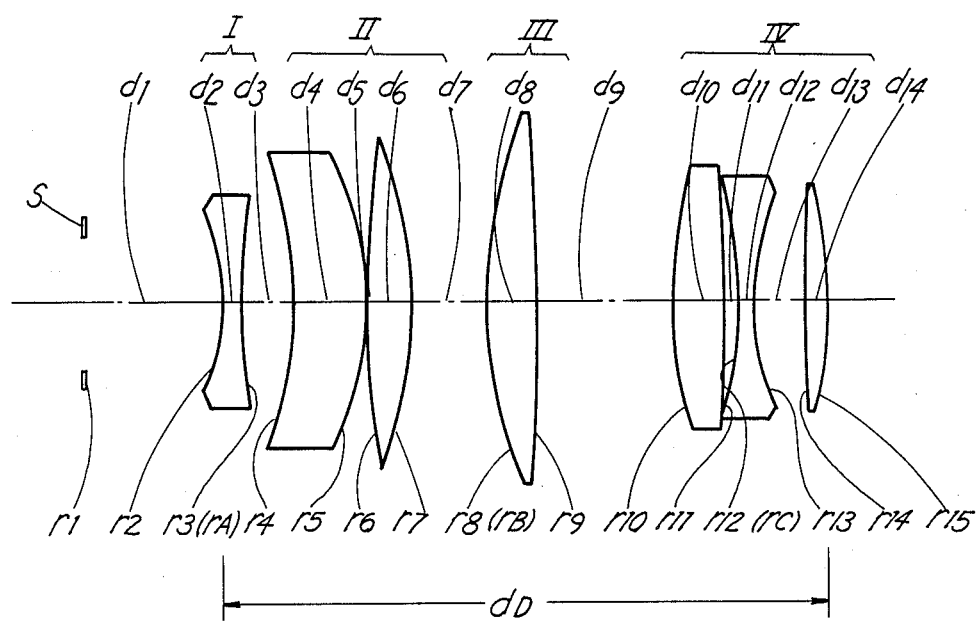
Figure 9B:
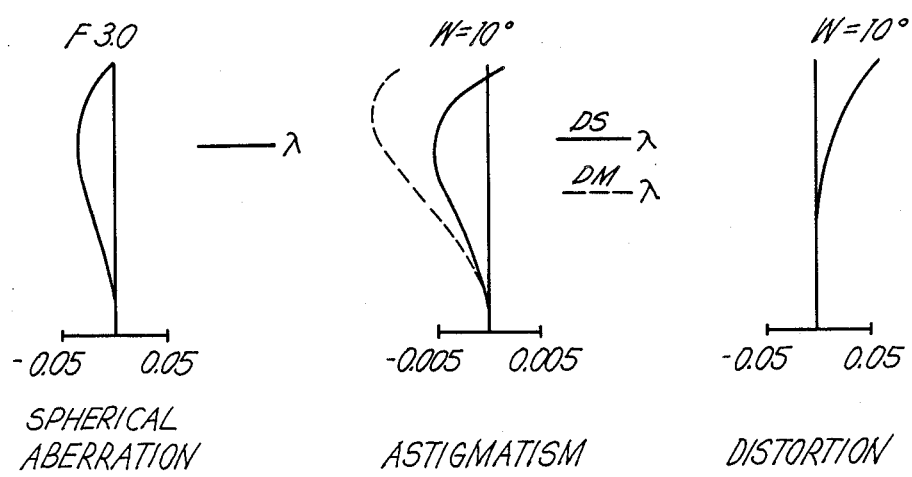
Figure 10A:
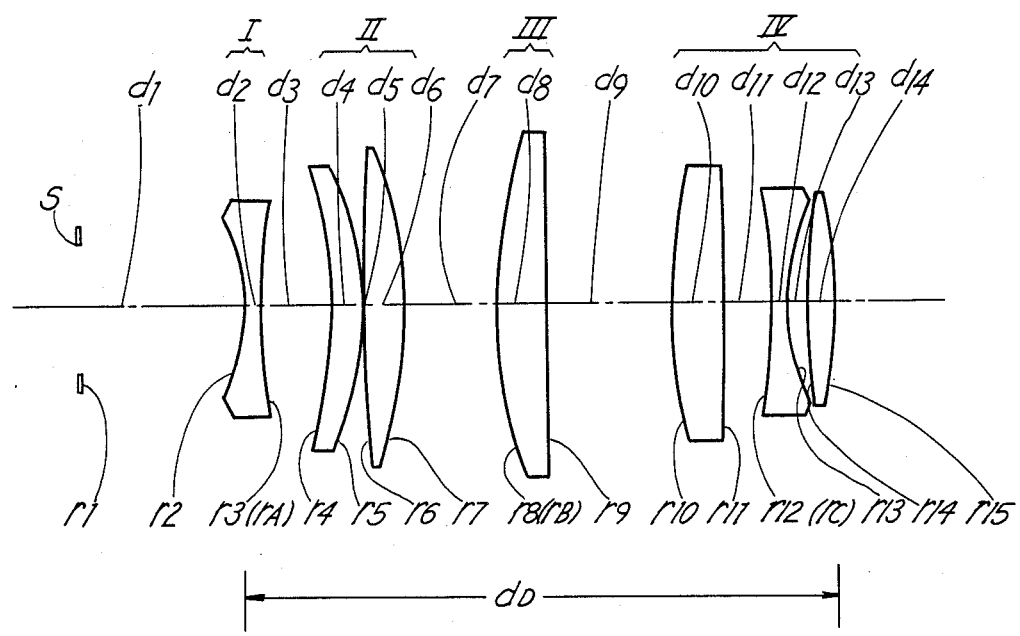
Figure 10B:
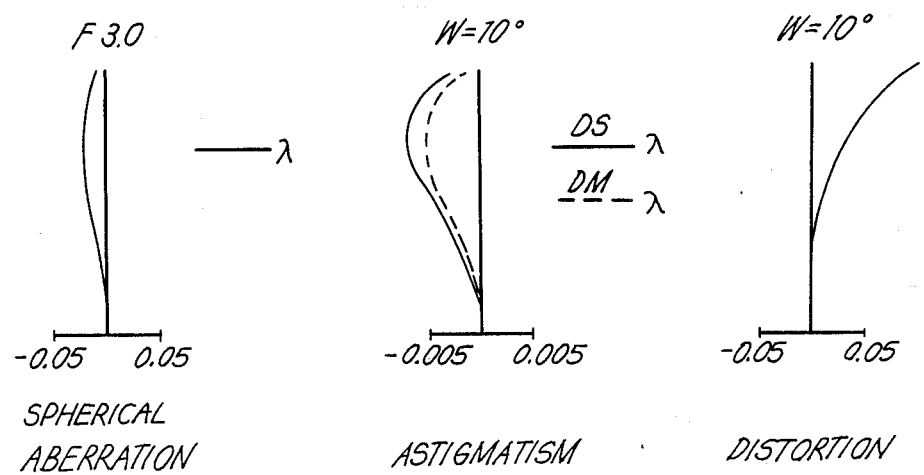
Figure 11A:
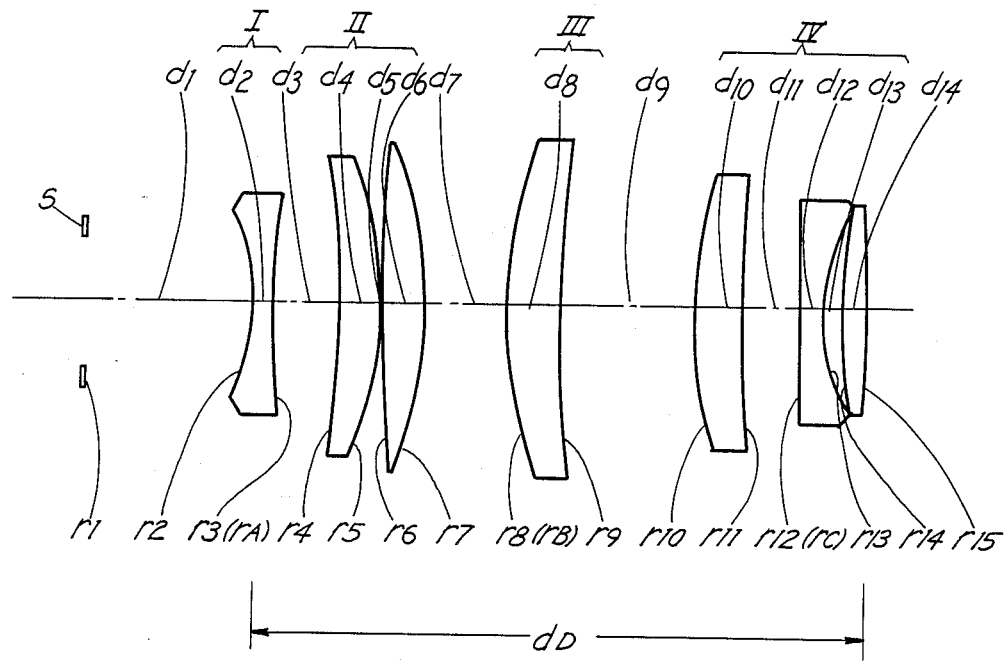
Figure 11B:
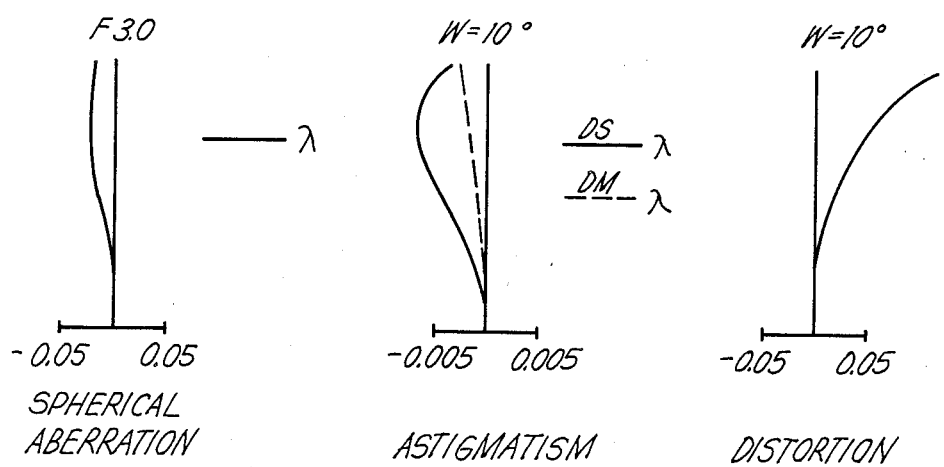
Figure 12A:
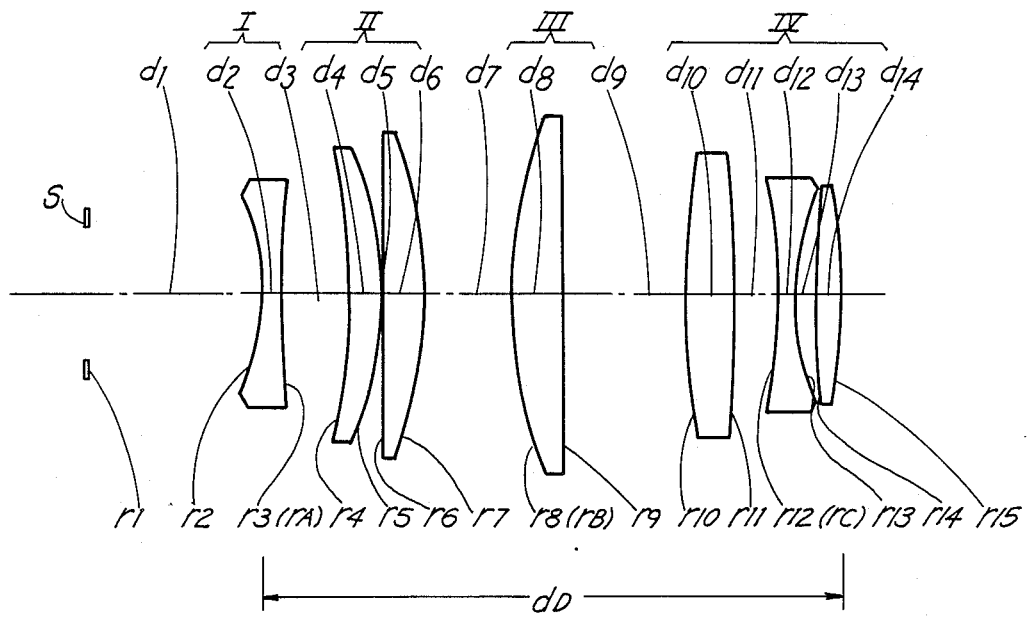
Figure 12B:
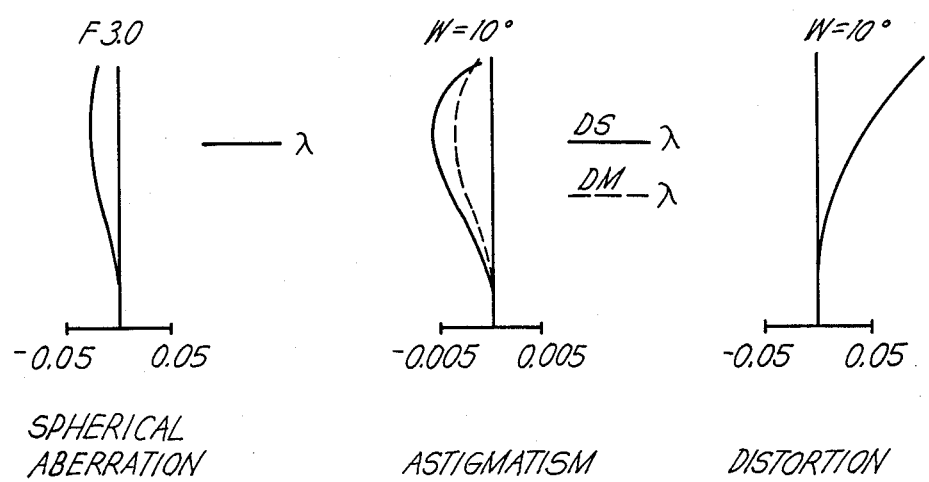
Figure 13A:
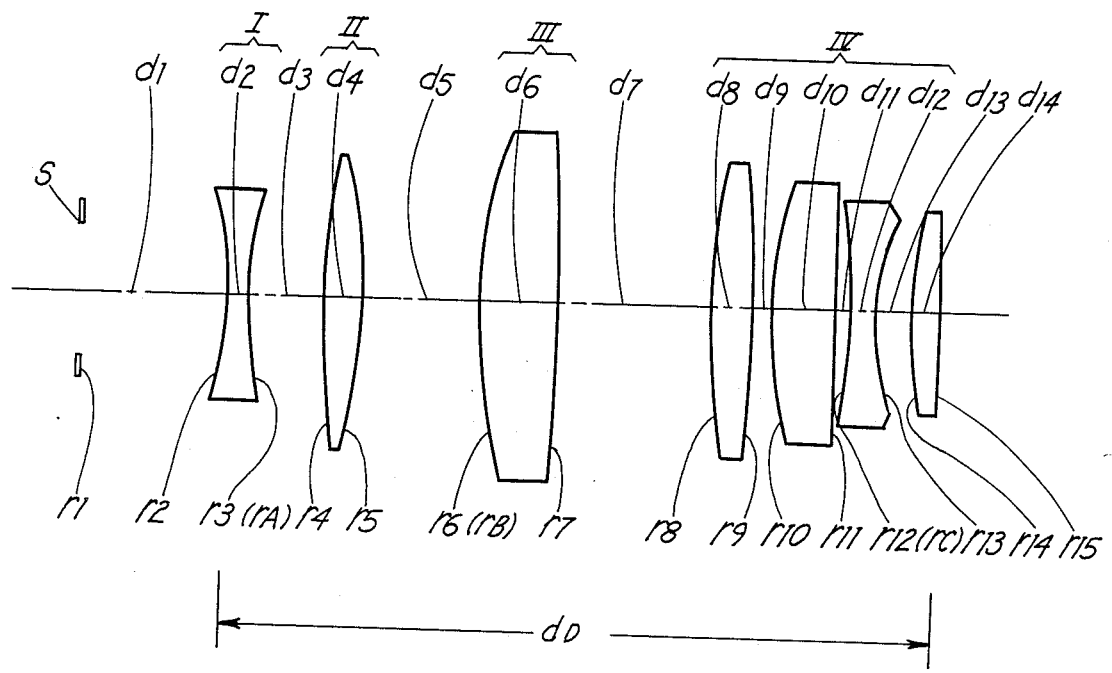
Figure 13B:
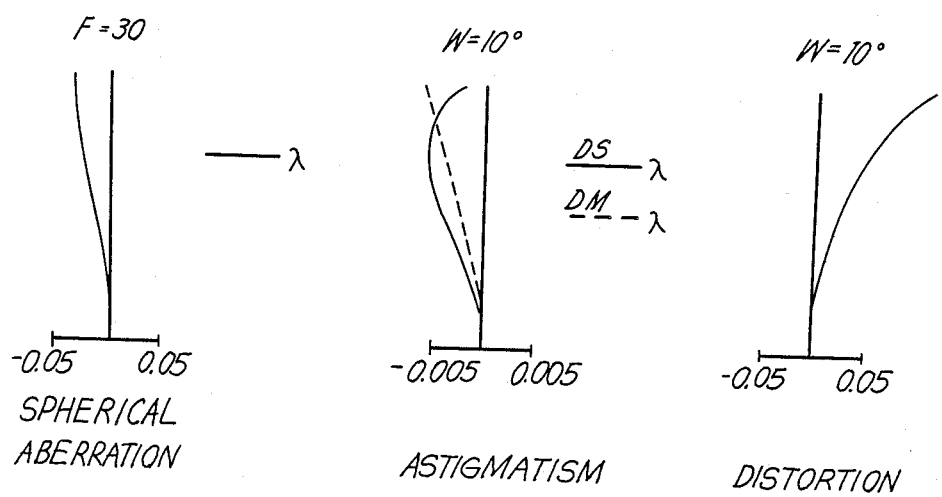
Figure 14A:
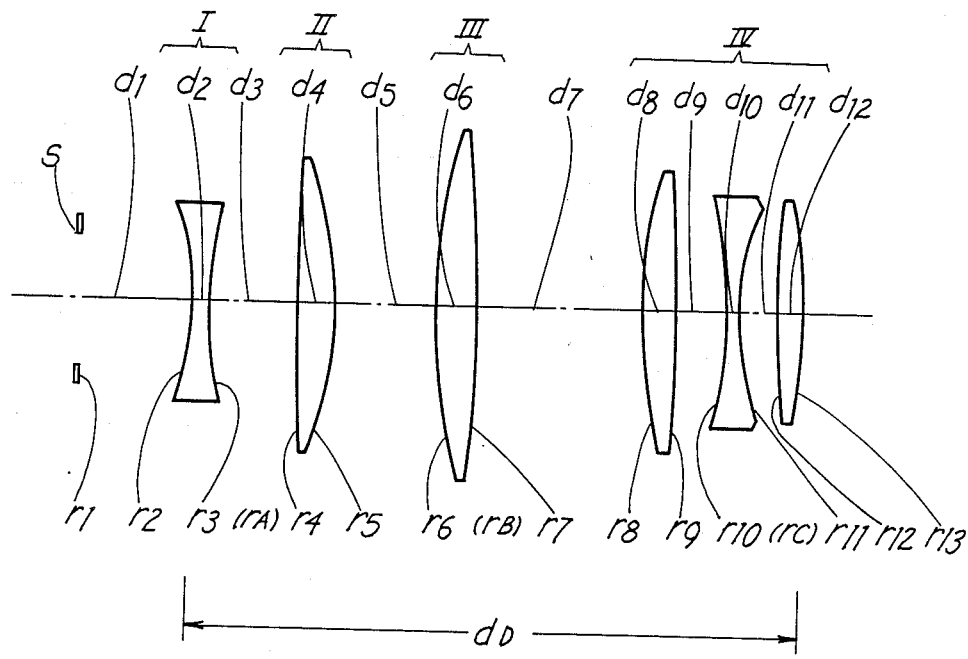
Figure 14B:
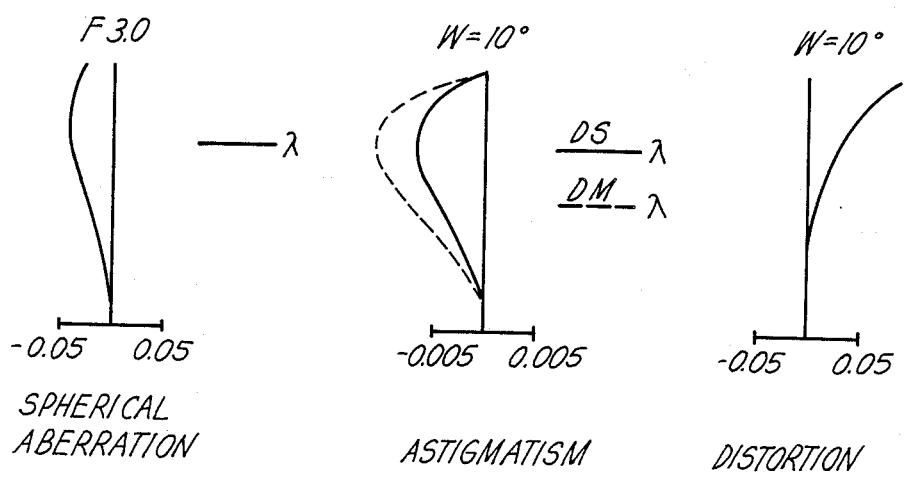
Figure 15A:
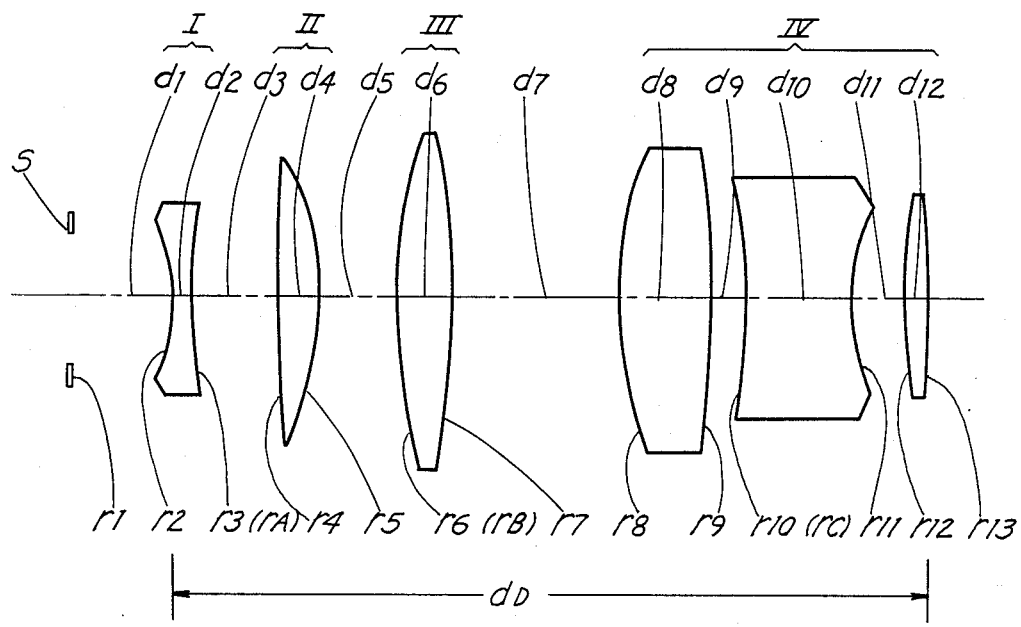
Figure 15B:
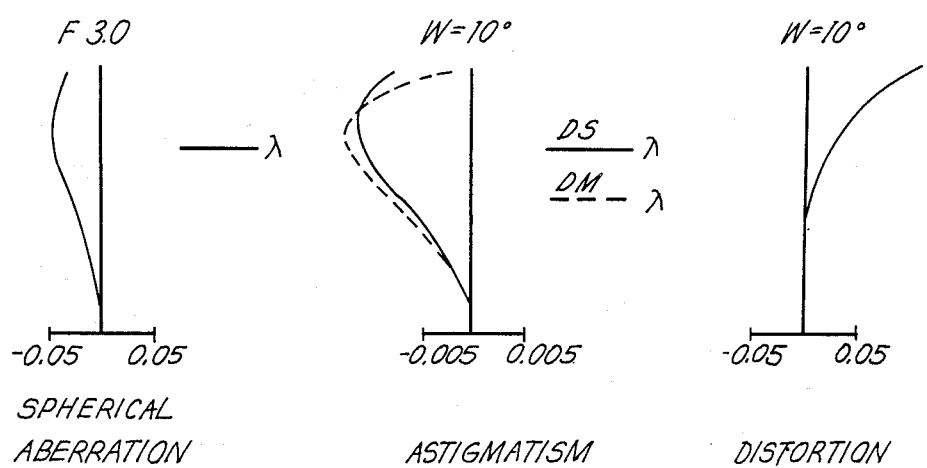
Figure 16A:
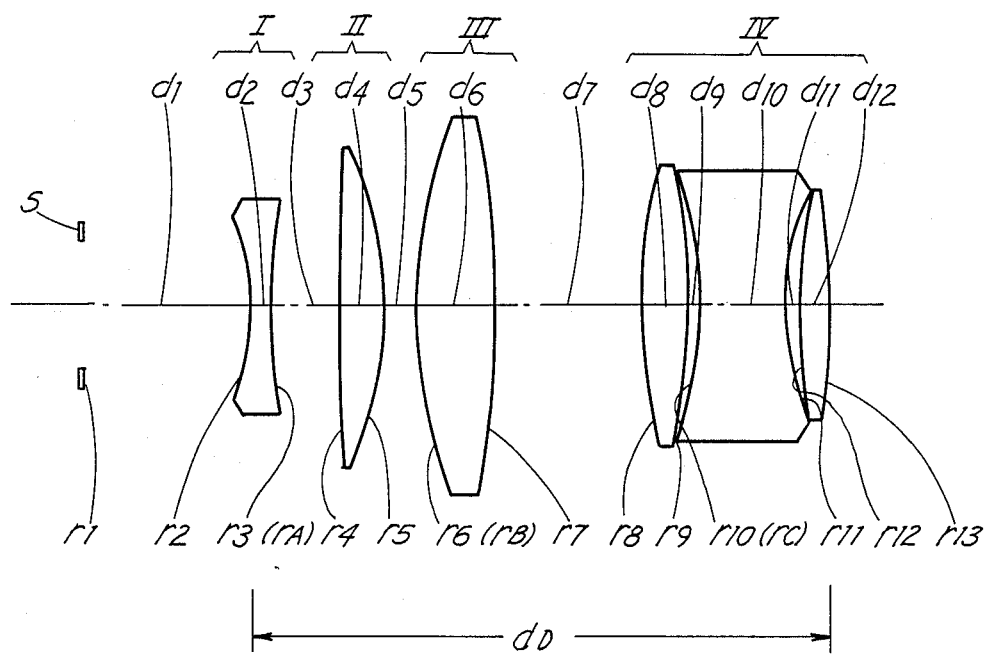
Figure 16B:
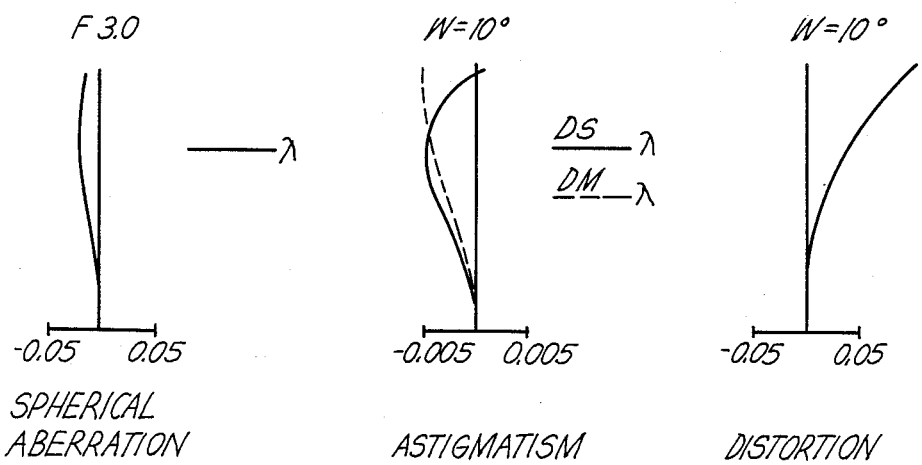
Figure 17A:
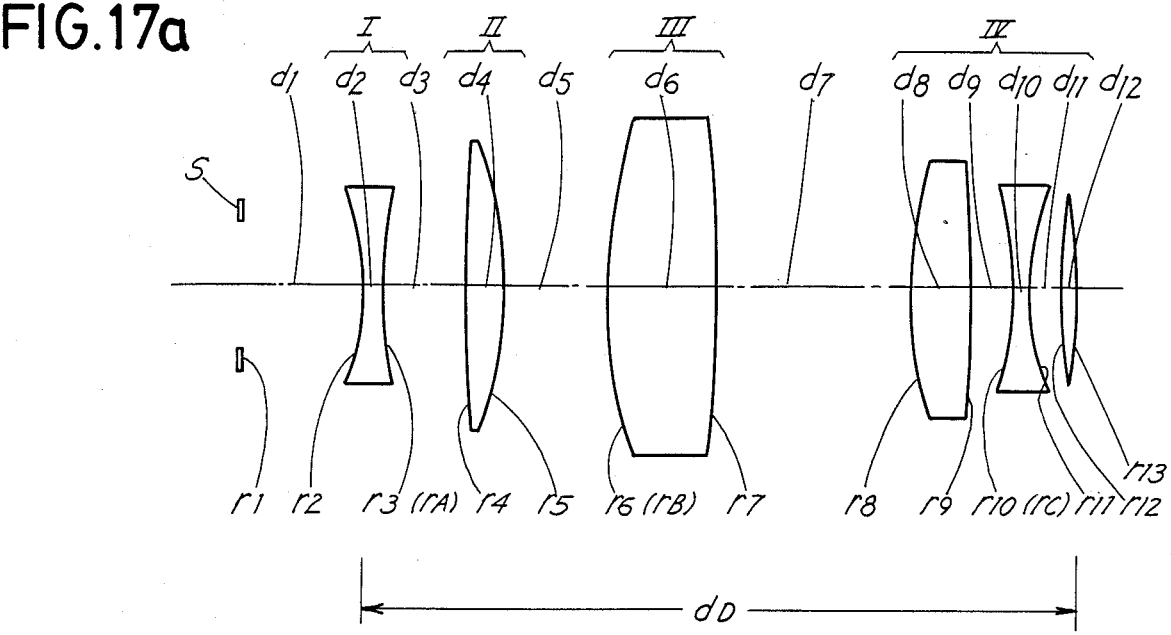
Figure 17B:
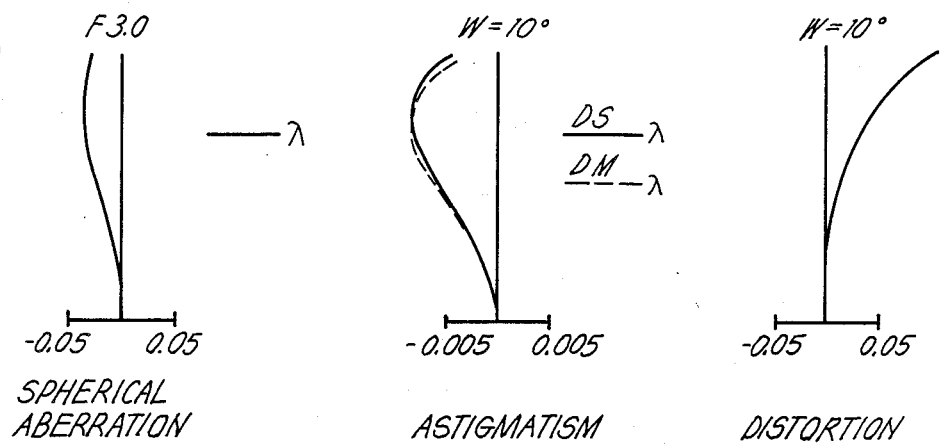

The following description is provided to enable any person skilled in the optical art to make and use the invention and sets forth the best modes contemplated by the inventor of carrying out his invention. Various modifications, however, will remain readily apparent to those skilled in the art, since the generic principles of the present invention have been defined herein specifically to provide a telecentric fθ lens system.

In the accompanying drawings which supplement the following tables, the lenses in accordance with the present invention are diagrammatically from the object field side (left side in the drawings) to the image field side (right side in the drawings).

The radii of curvature of the lenses are indicated by r, with a subscript (abscript number) corresponding to consecutive numbers of the lenses. The axial distances, d, along the optical axis are set forth in the tables and include both the axial spacings between the lenses and the thickness of the lenses. Finally, various data in sagittal and meridional directions are distinguished by subscript "S" and "M".

A first type of the telecentric fθ lens system will be explained hereinafter with reference to FIGS. 1 to 17.

In FIG. 1, a laser beam B which is modulated in accordance with data from a computer is projected onto a raw microfilm 1 through a first cylindrical lens 2, the polygonal mirror 3, the telecentric fθ lens system 4 and a second cylindrical lens 5. The first and second cylindrical lenses 3 and 5 function as the tilting correction optics. The telecentric fθ lens system 4 is disposed so that the aperture stop position of the lens system 4 coincides with the deflecting surface of the polygonal mirror 1.

Referring to FIGS. 2a to 17a, a construction of the telecentric fθ lens system 4 will be explained hereinafter. The lens system 4 comprises, from the object field side, an aperture stop S, a first lens unit I including at least one negative lens component, a second lens unit II consisting of one or two positive lens component, a third lens unit III including at least one positive lens component and a fourth lens unit IV including three or four lens components. Each lens unit peforms the following functions. The first lens unit I generates large negative distortion to guarantee a proper fθ characteristic. The second lens unit II compensates for the spherical aberration and the astigmatism generated by the first unit I in some degree and contributes to the formation of a fθ lens with a small F number. The third lens unit III effects to form a telecentric system, namely to form a fθ lens being almost telecentric and having small F number in cooperation with the first and second lens units I and II. The fourth lens unit IV effects to achieve a small F number, i.e., F=3 and amends mainly the coma aberratiin and the curvature of field. Respective lens units of course, cooperate with each other to give a satisfactory property to the whole lens system.

More particularly, it is preferable for the fourth lens unit IV to be constituted from three lenses of posi-nega-posi or four lenses of posi-posi-nega-posi. In this case it is easy to keep the off-axis aberration under control.

Further, the fθ lens system keeps satisfactory balance between each of the aberrations if the following conditions are fulfilled:

(1) $0 \leq f/r_A < 1$
(2) $0.6 < f/r_B < 1$
(3) $0 \leq -f/r_C < 1$
(4) $0.4 < f/d_D < 0.7$ wherein f is a total focal length of the lens system, $r_A$ is a radius of curvature of the image field side surface of the negative lens in the first lens unit I, $r_B$ is a radius of curvature of the object field side surface of the positive lens in the third lens unit III, $r_C$ is a radius of curvature of the object field side surface of the negative lens in the fourth lens unit IV and $d_D$ is an axial distance of the whole lens system.

The condition (1) is provided for generating large negative distortion to give a proper fθ characteristic. If the upper limit of the condition (1) is violated, the distortion becomes excessively generated. On the other hand, if the lower limit of the condition (1) is violated, it is difficult to control the amount of the aberrations.

The condition (2) is provided for amending the off-axis aberrations, especially, the astigmatism and distortion to guarantee a large aperture ratio. If the upper limit of the condition (2) is violated, it becomes difficult to amend the astigmatism. While it becomes difficult to amend the distortion if the lower limit of the condition (2) is violated.

The condition (3) is provided for fully amending the spherical and coma aberrations generated by other lens units. If the upper limit of the condition (3) is violated, the amounts of the spherical and coma aberrations become excessively larger. On the other hand, if the lower limit of the condition (3) is violated, the amounts of the spherical and coma aberrations become undesirably smaller.

The condition (4) defines the length of the whole lens system. If the upper limit of the condition (4) is violated, the space between the polygonal mirror and the lens system becomes so small as not to maintain a beam scanning construction. On the other hand, if the lower limit of the condition (4) is violated, the space between the lens system and the image surface becomes so small as not to dipose another mechanism or lens system. Namely, the compactness of the whole lens system is deteriorated, if the condition (4) is not fulfilled.

Next, the second type of the telecentric fθ lens system according to the present invention will be explained by referring to FIGS. 18 to 30.

Figure 18:
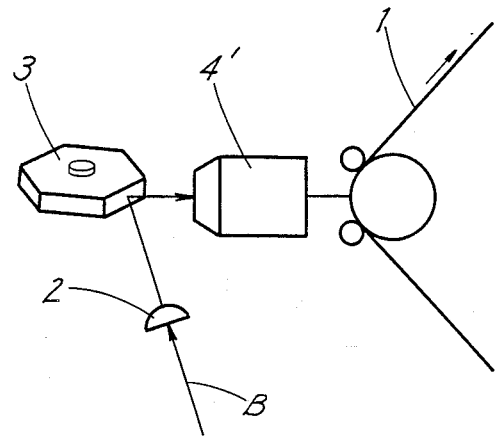
FIG. 18 is a diagram schematically showing a laser COM in which a seventeenth to twenty-eighth embodiment are to be used.
Figure 19A:
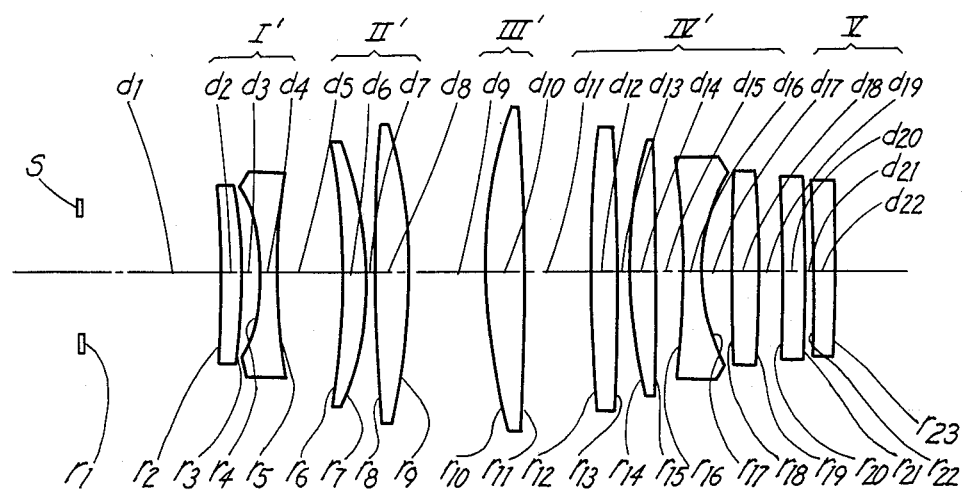
Figure 19B:
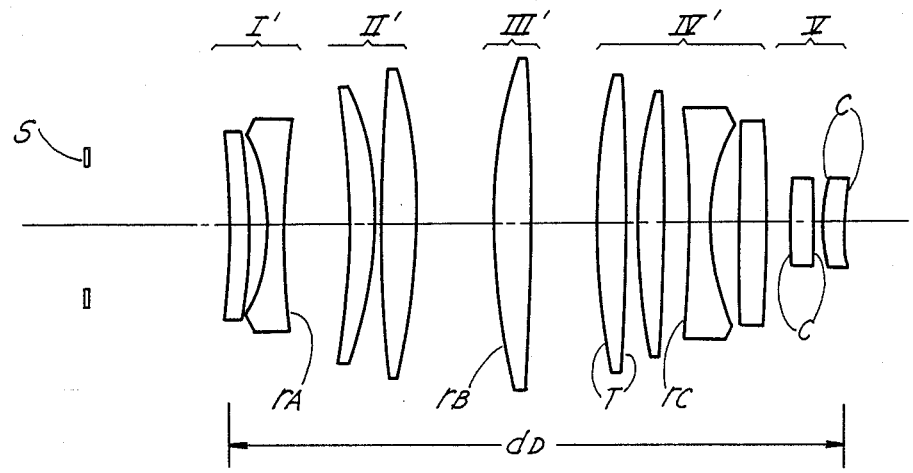
Figure 19C:
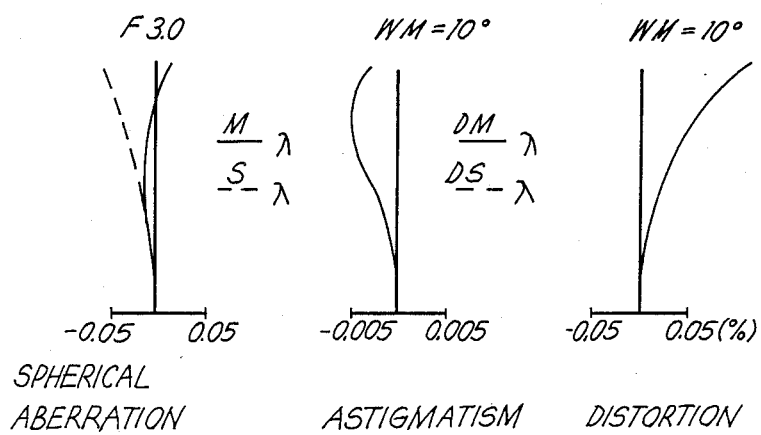
Figure 20A:
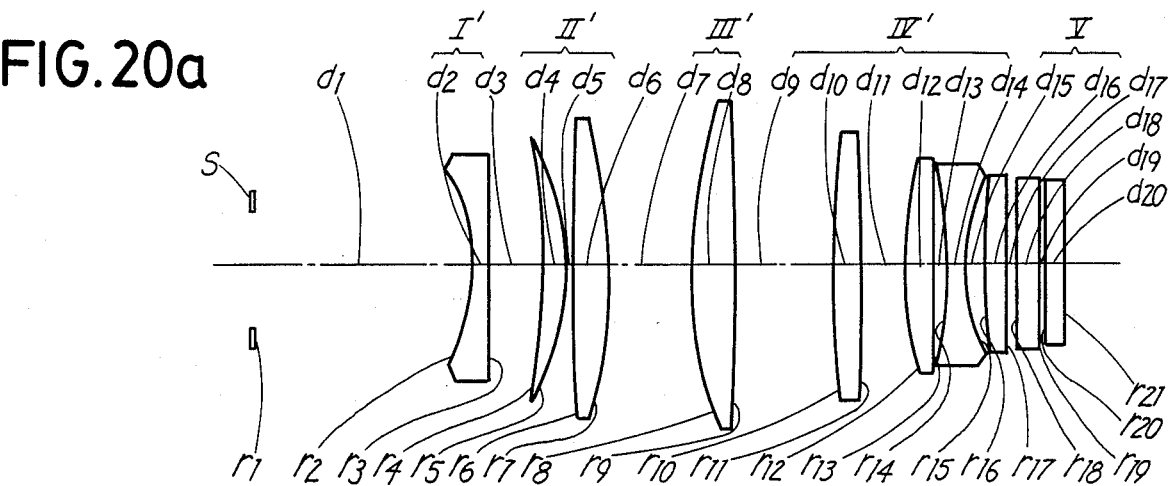
Figure 20B:
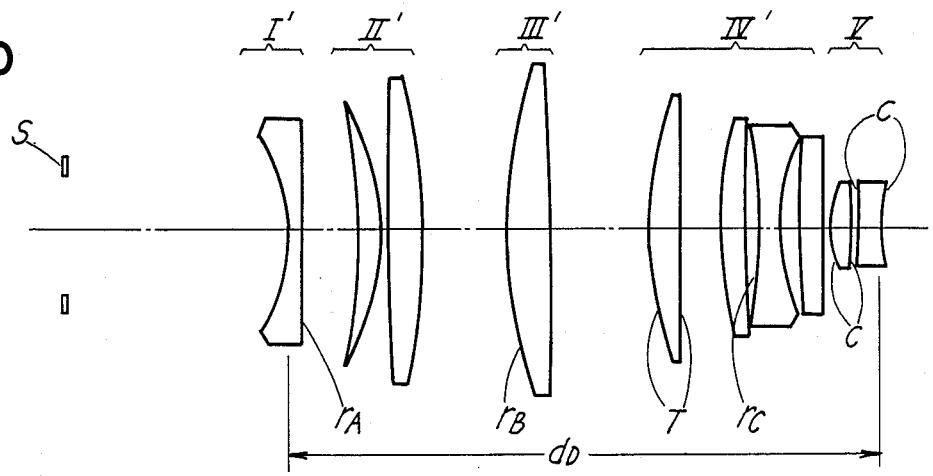
Figure 20C:
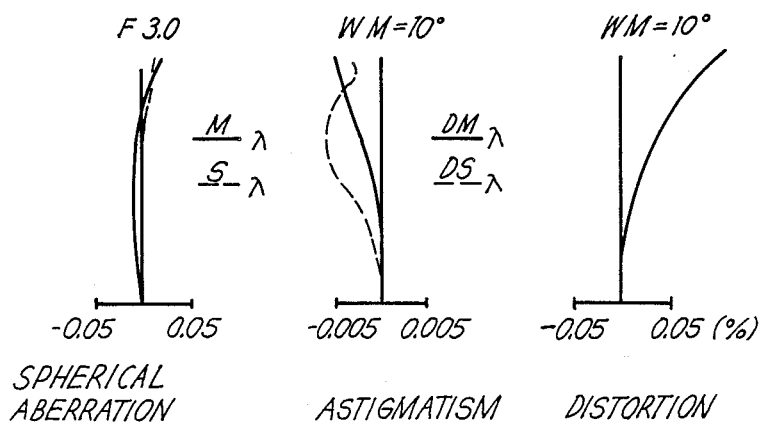
Figure 21A:
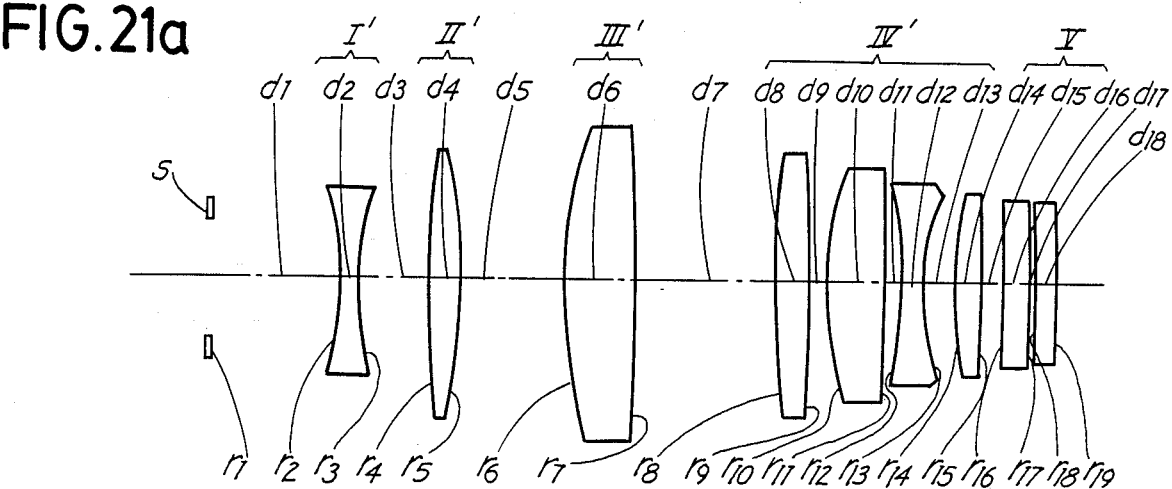
Figure 21B:
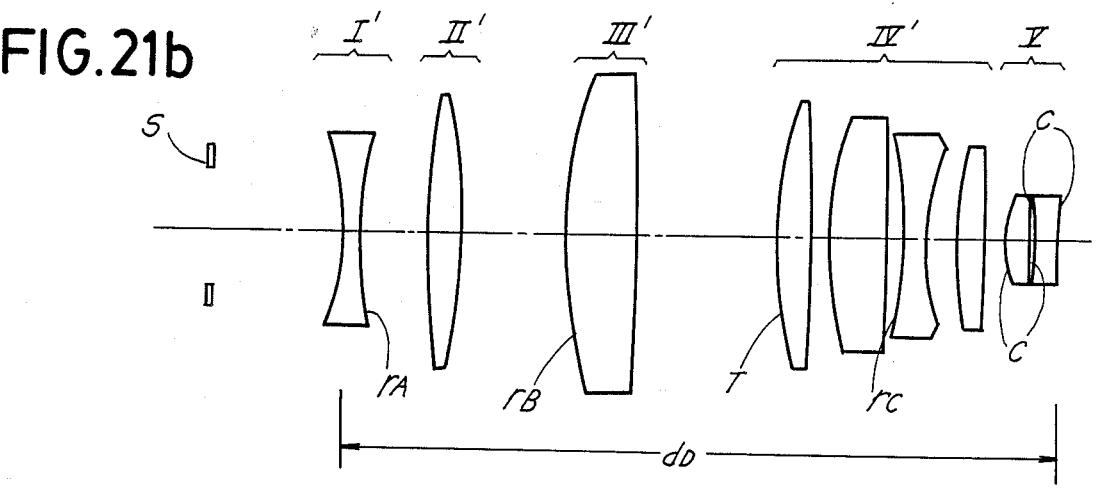
Figure 21C:
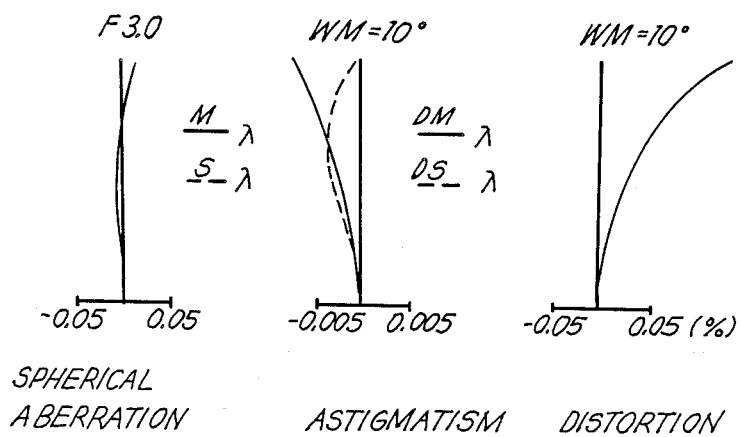
Figure 22A:
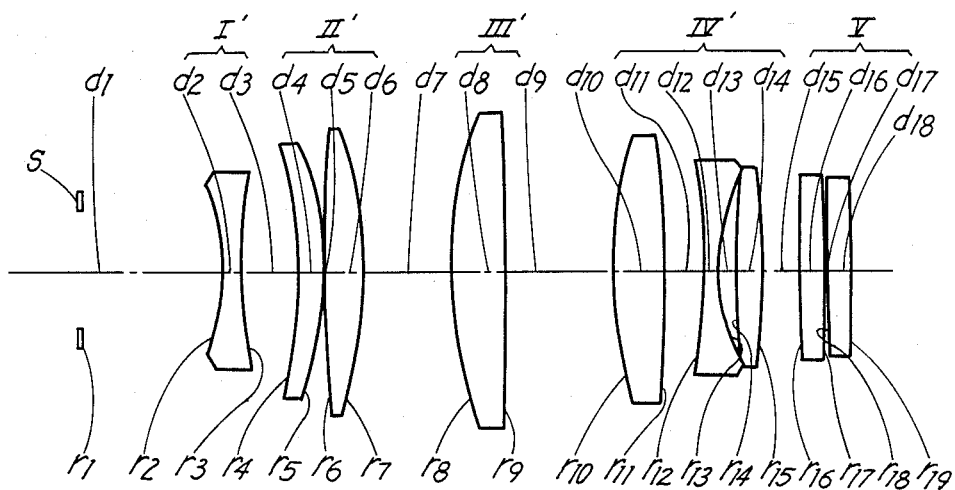
Figure 22B:
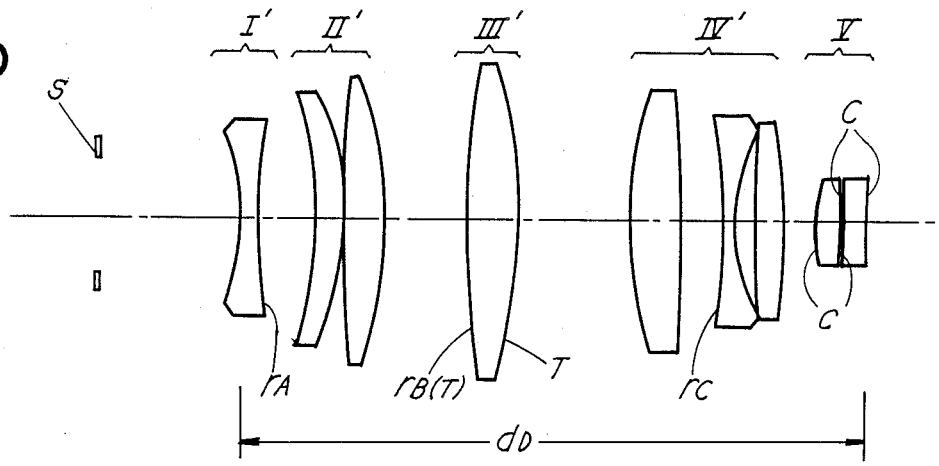
Figure 22C:
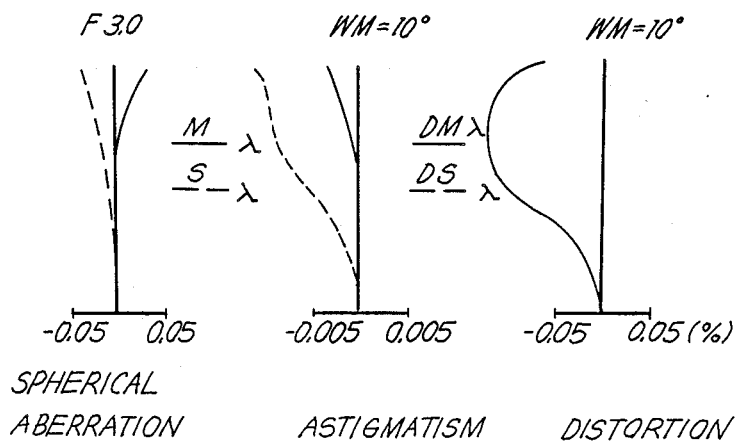
Figure 23A:
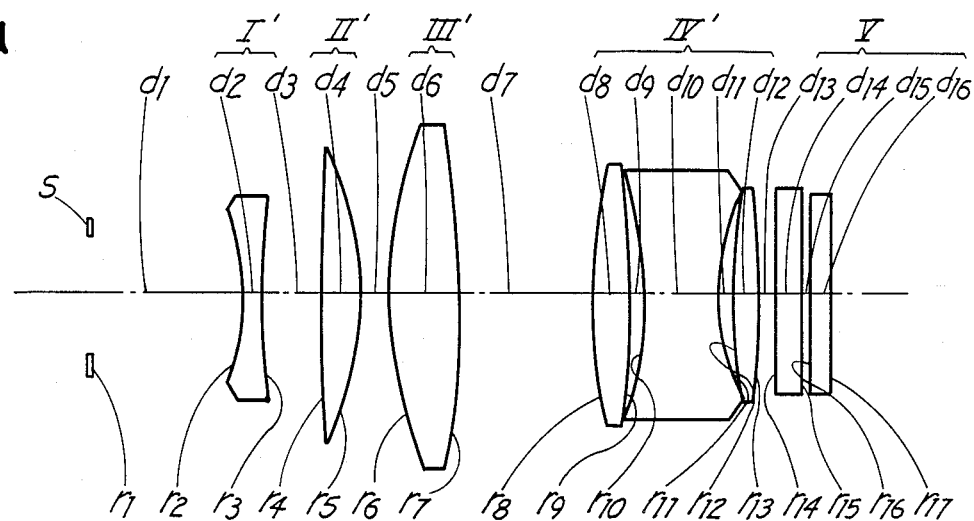
Figure 23B:
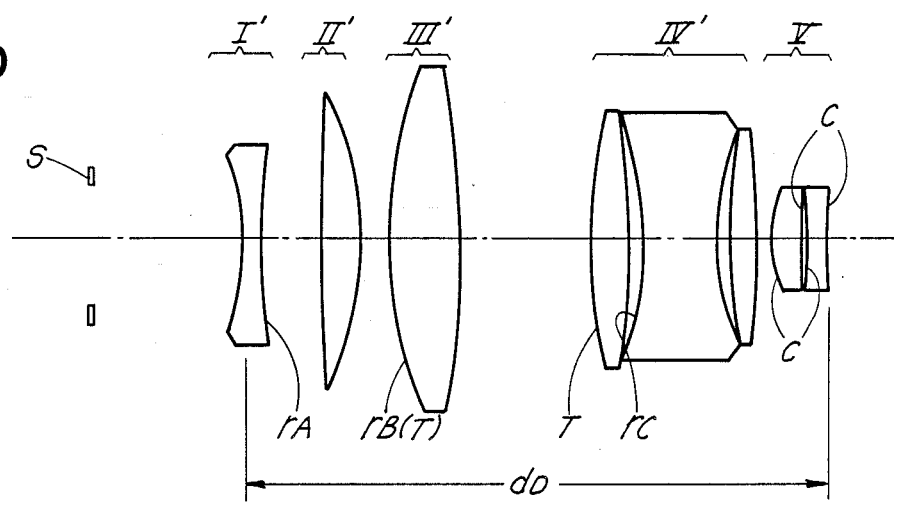
Figure 23C:
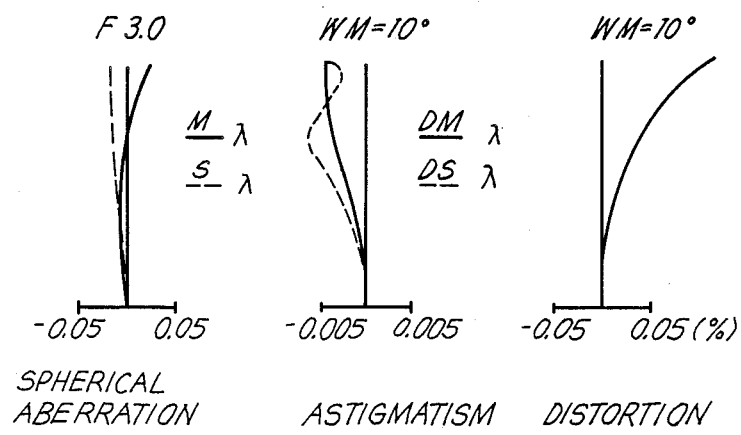
Figure 24A:
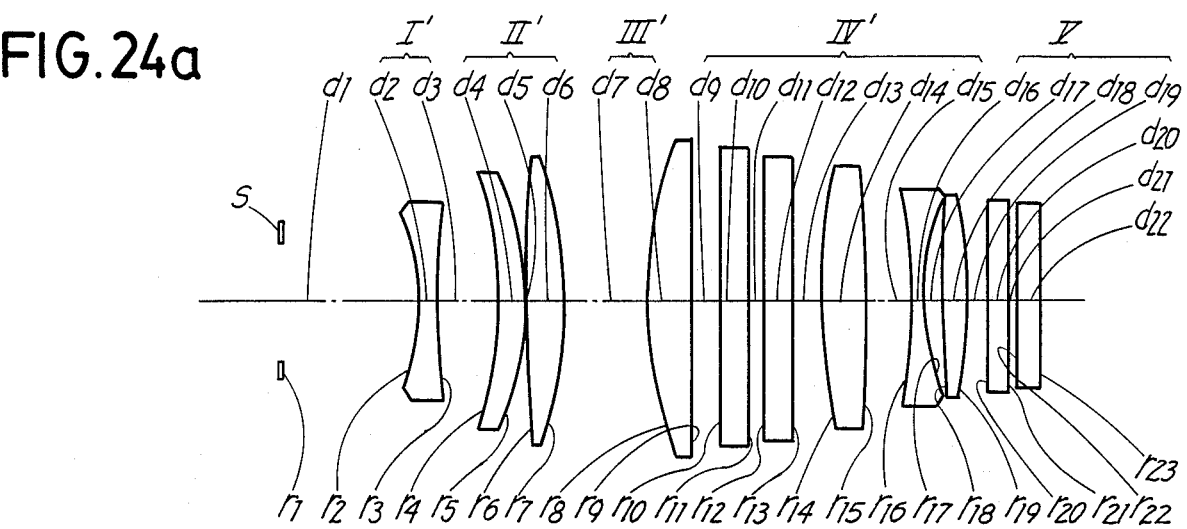
Figure 24B:
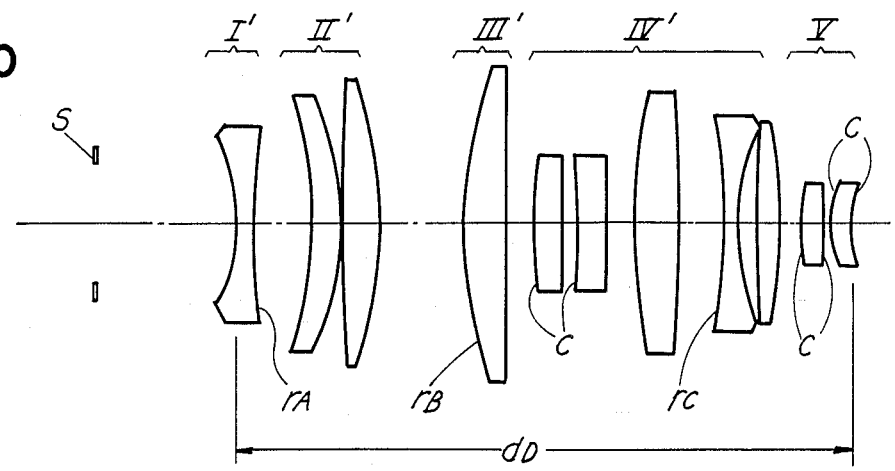
Figure 24C:
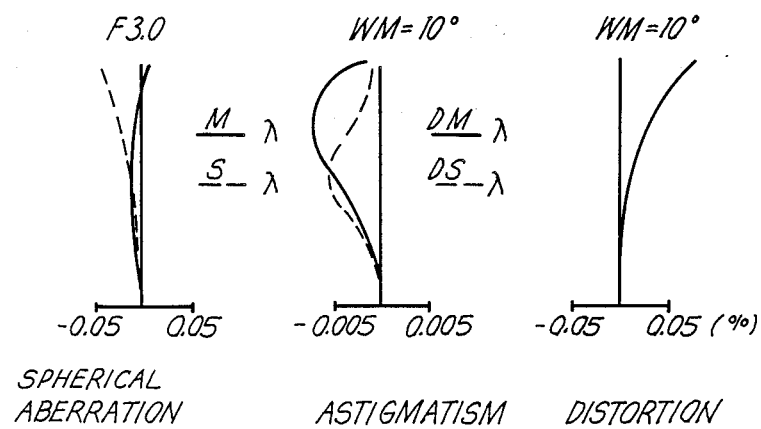
Figure 25A:
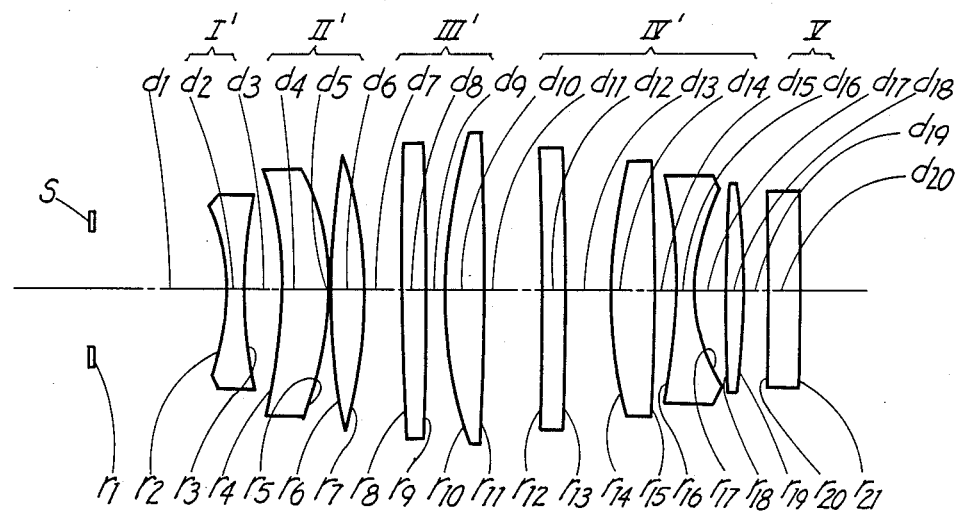
Figure 25B:
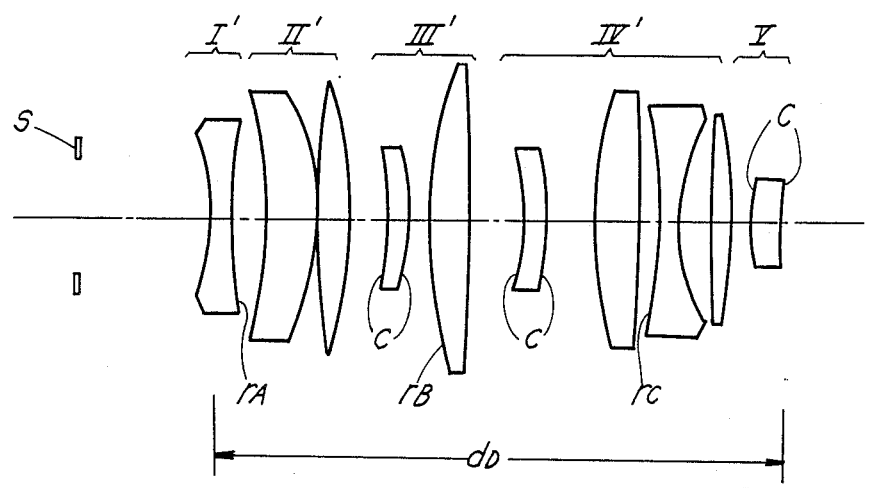
Figure 25C:
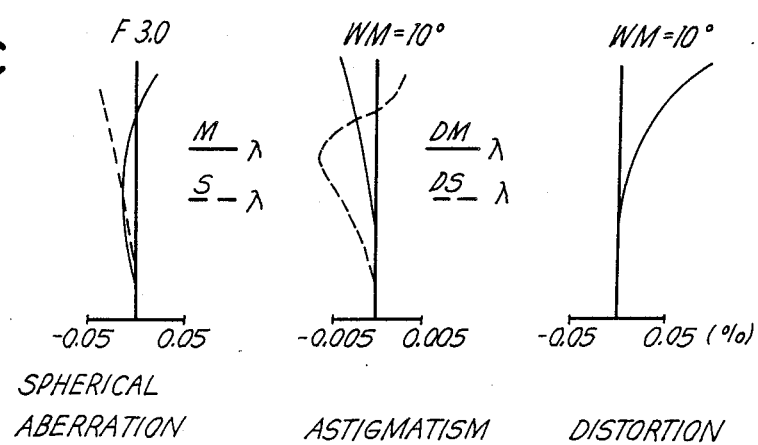
Figure 26A:
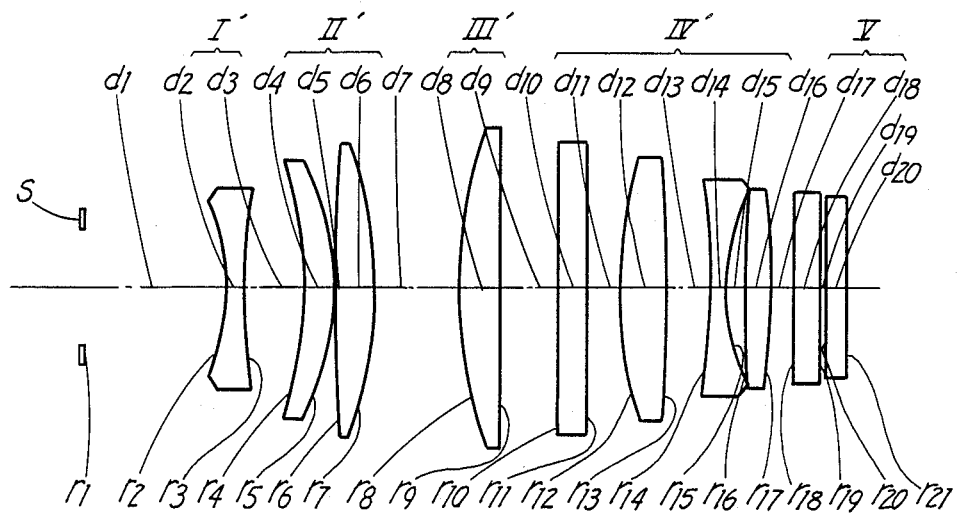
Figure 26B:
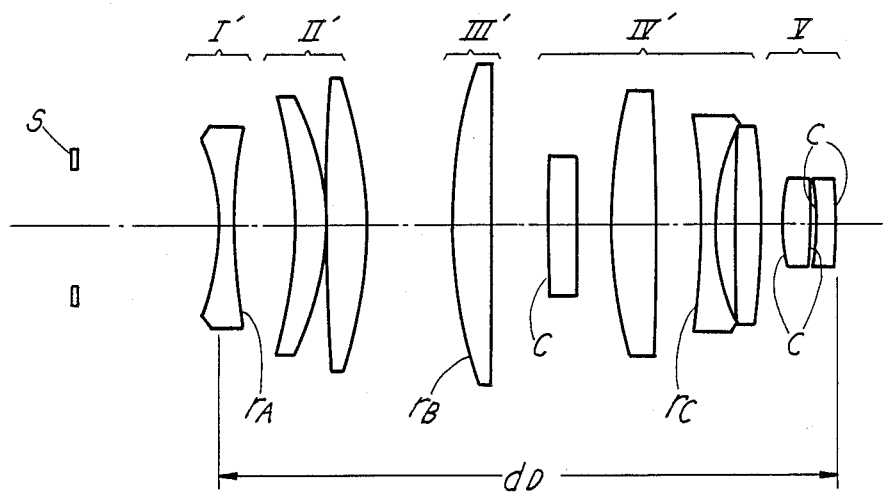
Figure 26C:
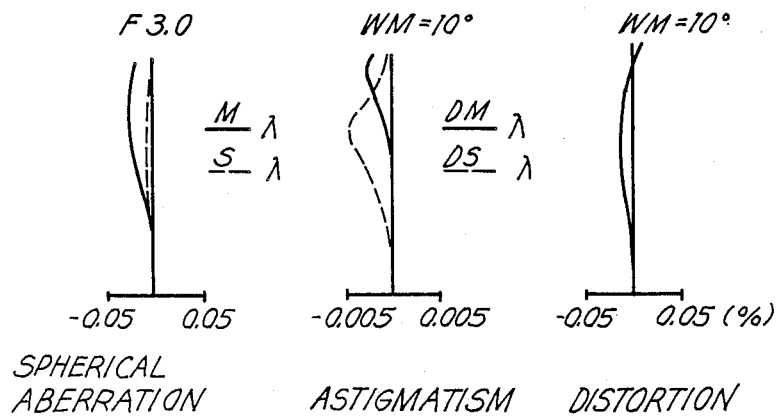
Figure 27A:
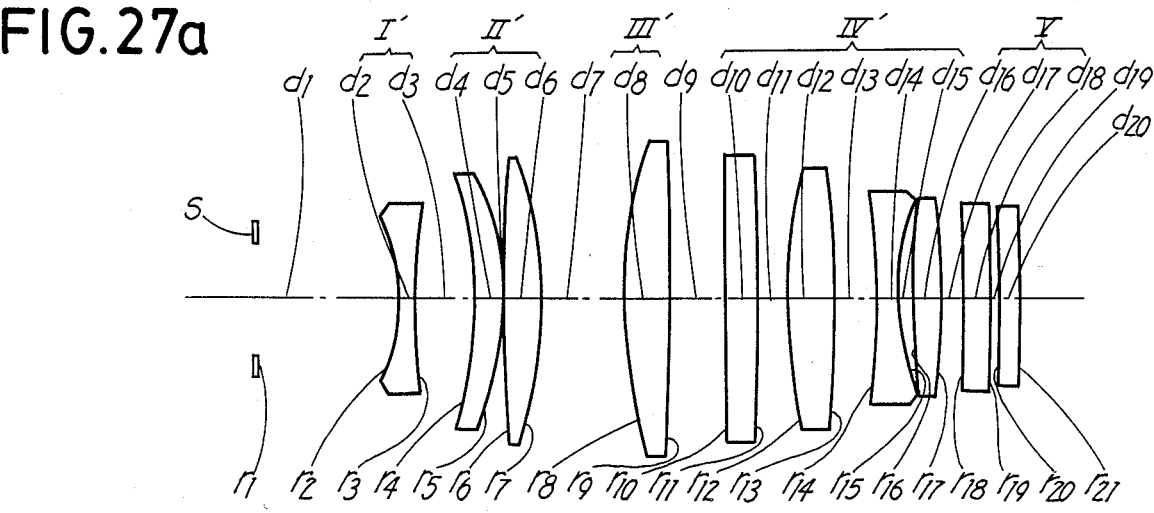
Figure 27B:
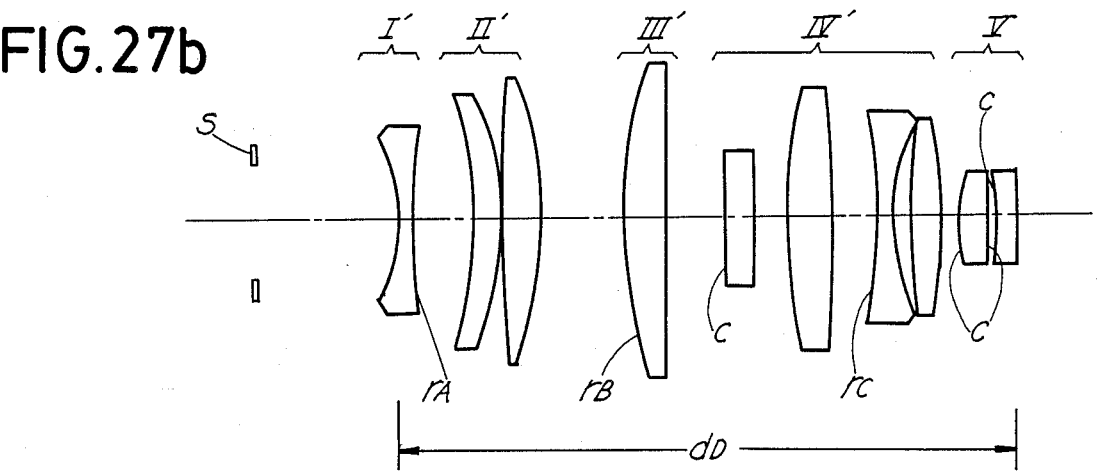
Figure 27C:
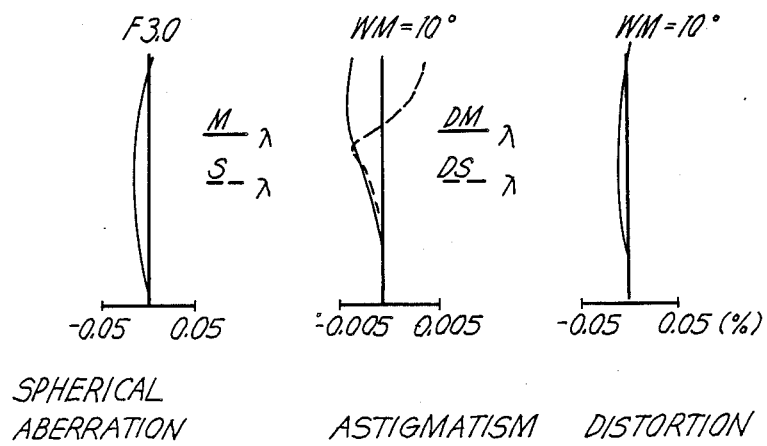
Figure 28A:
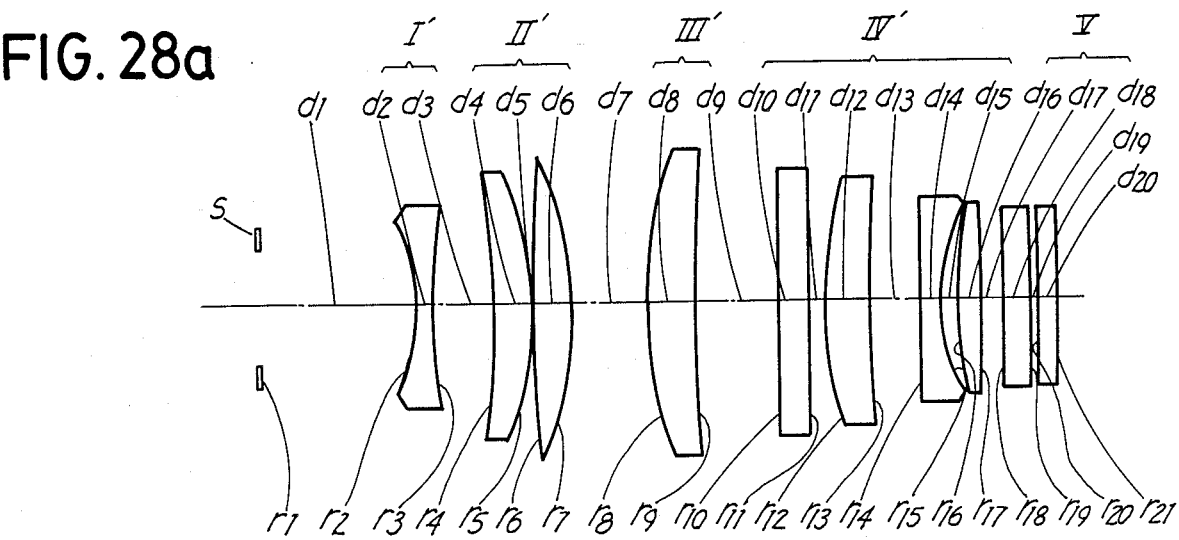
Figure 28B:
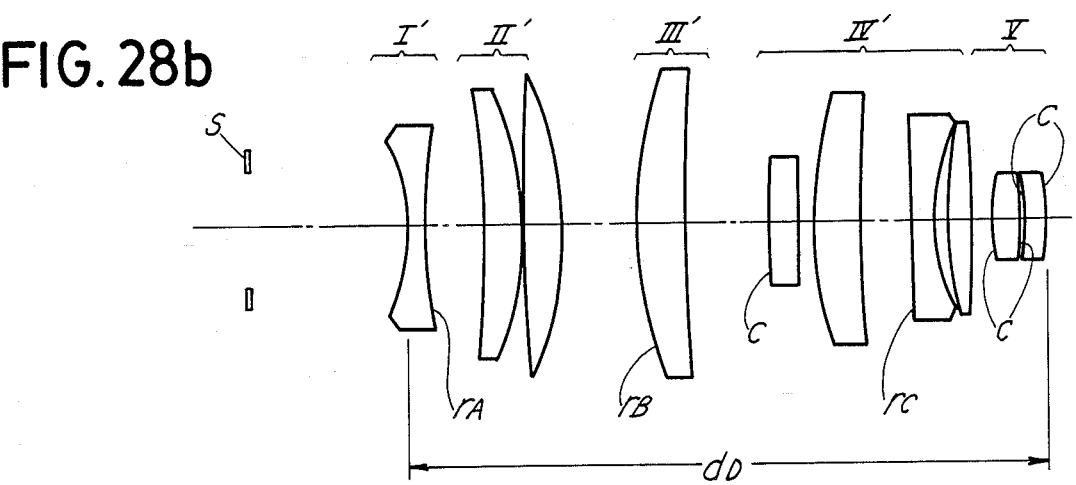
Figure 28C:
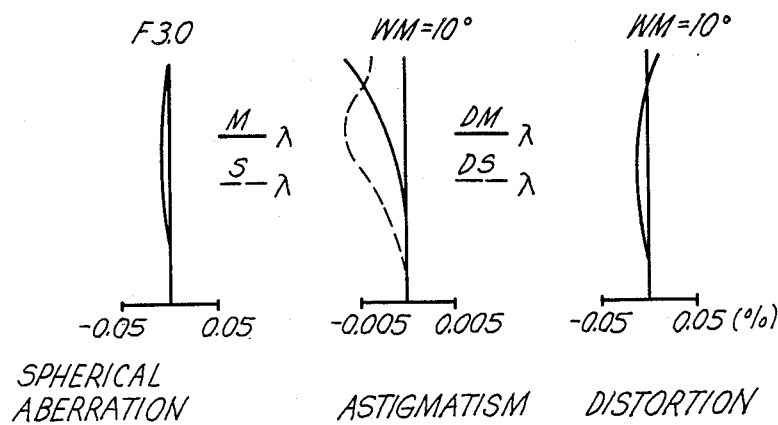
Figure 29A:
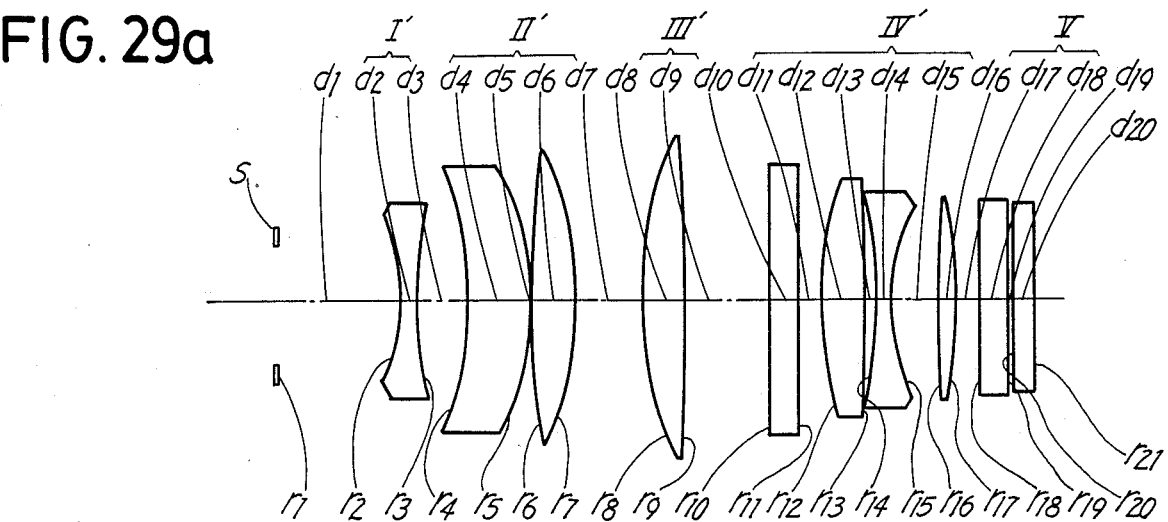
Figure 29B:
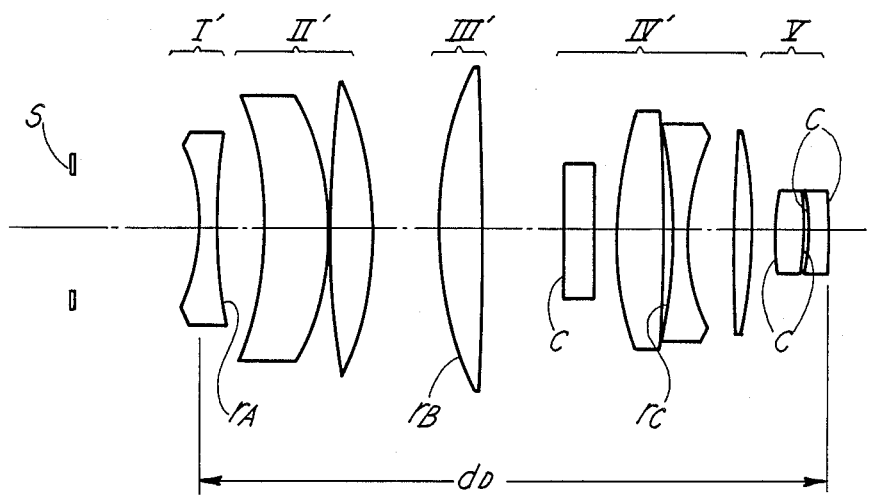
Figure 29C:
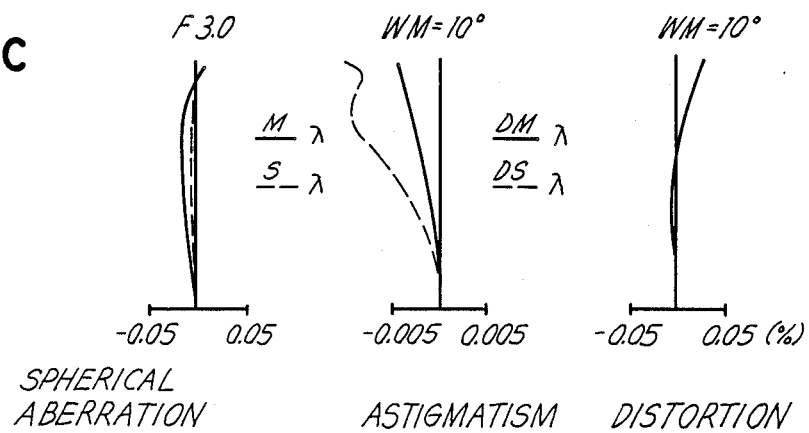
Figure 30A:
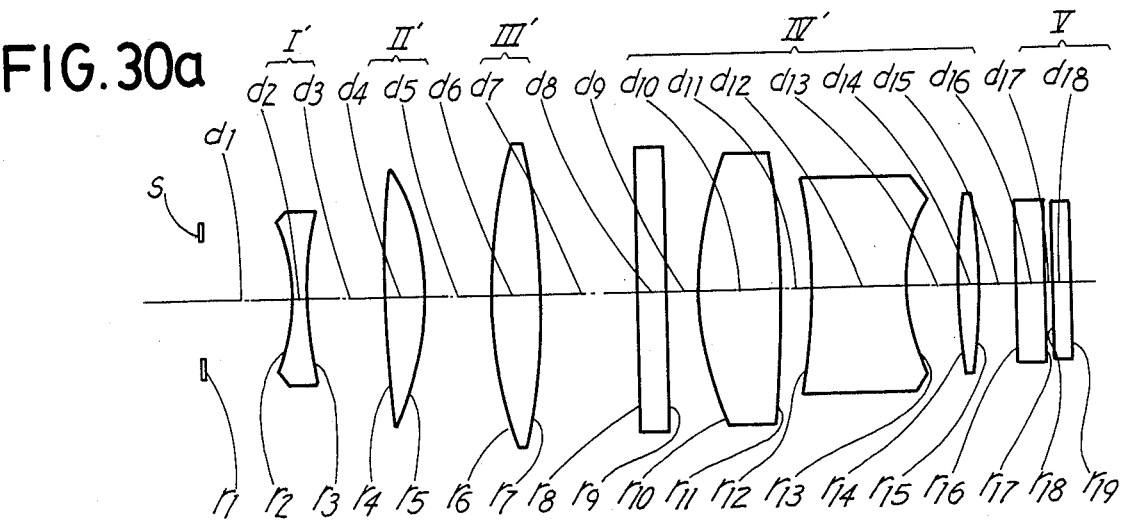
Figure 30B:
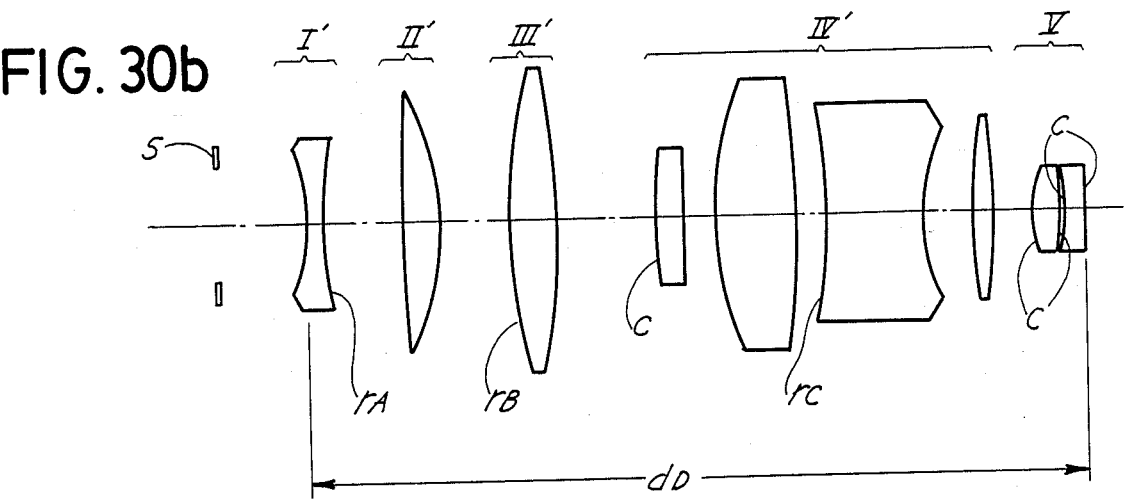
Figure 30C:
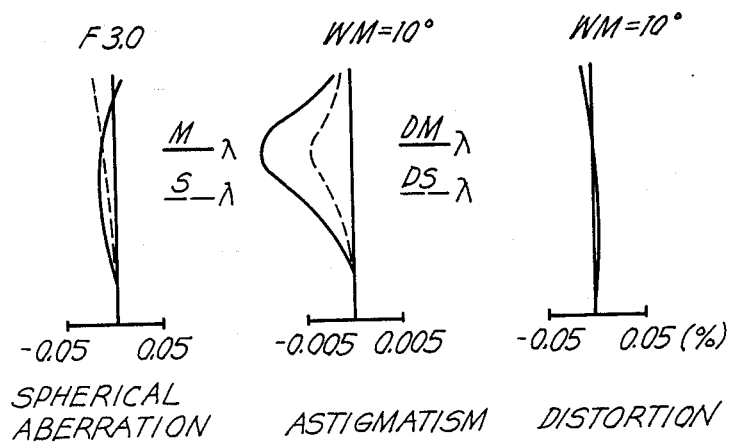

FIG. 18 shows a laser COM system in which the second type lens system is embodied. The laser COM system is similar to the system illustrated in FIG. 1 except for the lack of the second cylindrical lens 5 since the telecentric fθ lens system 4' of the second type has the tilting correction function therein instead of the second cylindrical lens.

Referring to FIGS. 19a to 30a and 19b to 30b, a construction of the second type telecentric fθ lens system 4' comprises, for the object field side, an aperture stop S', and a first lens unit I' including at least one negative lens component, a second lens unit II' consisting of one or two positive lens components, a third lens unit III' including at least one positive lens component, a fourth lens unit IV' including three or more lens components and a fifth lens unit V' of an anamorphic characteristic in which a refractive power of the fifth lens unit V in the sagittal direction is larger than that in the meridional direction, wherein the third and/or fourth lens unit has at least one anamorphic surface. The lens units I' to IV' perform the same functions as described in the previous explanation of the first type lens system. The fifth lens unit V guarantees the magnification $\beta s$ in the sagittal direction. In addition the anamorphic surface(s) formed on the lens surface of the third and/or fourth lens units is provided to maintain the power in the sagittal direction in a proper degree and to amend the astigmatism of the sagittal direction, namely, to guarantee the adequate flatness of the image plane. Of course, respective lens units cooperate with each other to give a satisfactory property to the whole lens system.

Especially, if the following conditions are fulfilled, the lens design becomes flexible.

$$f_S < f_M$$
$$0.4 < -\beta_S < 0.8$$

wherein,
$f_S$: a focal length of the sagittal direction
$f_M$: a focal length of the meridional direction
$\beta_S$: a magnification of the sagittal direction Furthermore, the f$\theta$ lens system of the second type keeps a satsifactory balance between each aberration if the conditions (1) to (4) are maintained as previously explained.

The telecentrix f$\theta$ system according to the present invention is preferable to a laser COM system of a high dot density recording such as 9600 dots/inch because of the small F number, to put it concretely, FNo.=3.0. Furthermore, the telecentric f$\theta$ lens system according to the present invention can be made in a compact size.

The following tables show lens data of respective embodiments in which the refractive index N is a value at $\lambda = 632.8$ nm, and 2$\omega$ represents an angle of view. With respect to the seventeenth to twenty-eighth embodiments, the symbols represent the following parameters:

$f_M$: focal length in the meridional direction
$\beta_M$: magnification in the meridional direction;
FNo.$_M$: F number in the meridional direction;
2$\omega_M$: angle of view in the meridional direction;
$f_S$: focal length in the sagittal direction;
$\beta_S$: magnification in the sagittal direction;
eff.FNo.$_S$: effective F number in the sagittal direction.

Additionally, each of the tables show the values of conditions (1) to (4).

The lens system can further be defined by the following conditions:

$$0 \leq f_M/r_A < 1$$
$$0.6 < f_M/r_B < 1$$
$$0 \leq -f_M/r_C < 1$$
$$0.4 < f_M/r_D < 0.6$$

wherein $f_M$ is a total focal length of the lens system in the meridional direction, $r_A$ is a radius of curvature of the image field side surface of the negative lens in the first lens unit I, $r_B$ is a radius of curvature of the object field side surface of the positive lens in the third lens unit III, $r_C$ is a radius of curvature of the object field side surface of the negative lens in the fourth lens unit IV and $d_D$ is an axial distance of the whole lens system.

TABLE 1

| f = 50 mm FNo. = 3.0 2$\omega$ = 20° $\lambda$ = 632.8 nm | | | | |
|---|---|---|---|---|
| radius of curvature | | axial distance | | refractive index |
| $r_1$ | (stop) | $d_1$ | 21.461 | |
| $r_2$ | −108.861 | $d_2$ | 3.000 | $n_1$ 1.51508 |

TABLE 1-continued

| f = 50 mm FNo. = 3.0 2$\omega$ = 20° $\lambda$ = 632.8 nm | | | | |
|---|---|---|---|---|
| radius of curvature | | axial distance | | refractive index |
| $r_3$ | −68.207 | $d_3$ | 2.500 | |
| $r_4$ | −28.749 | $d_4$ | 2.500 | $n_2$ 1.51508 |
| $r_5$ | 81.065 | $d_5$ | 9.800 | |
| $r_6$ | −121.077 | $d_6$ | 3.800 | $n_3$ 1.51508 |
| $r_7$ | −51.016 | $d_7$ | 1.000 | |
| $r_8$ | 233.872 | $d_8$ | 5.500 | $n_4$ 1.74969 |
| $r_9$ | −75.441 | $d_9$ | 11.800 | |
| $r_{10}$ | 73.191 | $d_{10}$ | 5.500 | $n_5$ 1.74969 |
| $r_{11}$ | −406.367 | $d_{11}$ | 10.400 | |
| $r_{12}$ | 217.151 | $d_{12}$ | 4.000 | $n_6$ 1.74969 |
| $r_{13}$ | −238.979 | $d_{13}$ | 1.800 | |
| $r_{14}$ | 68.249 | $d_{14}$ | 3.600 | $n_7$ 1.74969 |
| $r_{15}$ | −553.879 | $d_{15}$ | 4.200 | |
| $r_{16}$ | −94.861 | $d_{16}$ | 2.800 | $n_8$ 1.74969 |
| $r_{17}$ | 29.740 | $d_{17}$ | 4.200 | |
| $r_{18}$ | 323.347 | $d_{18}$ | 4.200 | $n_9$ 1.74969 |
| $r_{19}$ | −140.240 | $\Sigma d$ | 102.061 | (s' = 27.538) |
| $f/r_A = f/r_5 = 0.62$, $f/r_B = f/r_{10} = 0.68$, | | | | |
| $-f/r_C = -f/r_{16} = 0.53$, $f/d_D = 0.68$ | | | | |

TABLE 2

| f = 50 mm FNo. = 3.0 2$\omega$ = 20° $\lambda$ = 632.8 nm | | | | |
|---|---|---|---|---|
| radius of curvature | | axial distance | | refractive index |
| $r_1$ | (stop) | $d_1$ | 22.814 | |
| $r_2$ | −31.371 | $d_2$ | 2.500 | $n_1$ 1.51508 |
| $r_3$ | 87.656 | $d_3$ | 8.575 | |
| $r_4$ | −52.182 | $d_4$ | 3.302 | $n_2$ 1.51508 |
| $r_5$ | −38.133 | $d_5$ | 0.717 | |
| $r_6$ | 214.112 | $d_6$ | 5.479 | $n_3$ 1.74969 |
| $r_7$ | −78.975 | $d_7$ | 12.345 | |
| $r_8$ | 71.303 | $d_8$ | 10.911 | $n_4$ 1.74969 |
| $r_9$ | −399.439 | $d_9$ | 14.374 | |
| $r_{10}$ | 160.273 | $d_{10}$ | 4.708 | $n_5$ 1.74969 |
| $r_{11}$ | −299.186 | $d_{11}$ | 4.154 | |
| $r_{12}$ | 62.840 | $d_{12}$ | 3.453 | $n_6$ 1.74969 |
| $r_{13}$ | −513.236 | $d_{13}$ | 3.190 | |
| $r_{14}$ | −83.279 | $d_{14}$ | 3.166 | $n_7$ 1.74969 |
| $r_{15}$ | 31.226 | $d_{15}$ | 3.649 | |
| $r_{16}$ | 256.708 | $d_{16}$ | 2.798 | $n_8$ 1.74969 |
| $r_{17}$ | −125.883 | $\Sigma d$ | 106.135 | (s' = 26.493) |
| $f/r_A = f/r_3 = 0.57$, $f/r_B = f/r_8 = 0.70$, | | | | |
| $-f/r_C = -f/r_{14} = 0.60$, $f/d_D = 0.60$ | | | | |

TABLE 3

| f = 50 mm FNo. = 3.0 2$\omega$ = 20° $\lambda$ = 632.8 nm | | | | |
|---|---|---|---|---|
| radius of curvature | | axial distance | | refractive index |
| $r_1$ | (stop) | $d_1$ | 22.713 | |
| $r_2$ | −31.047 | $d_2$ | 2.494 | $n_1$ 1.51508 |
| $r_3$ | 76.304 | $d_3$ | 8.579 | |
| $r_4$ | −51.692 | $d_4$ | 3.739 | $n_2$ 1.51508 |
| $r_5$ | −38.767 | $d_5$ | 0.843 | |
| $r_6$ | 196.465 | $d_6$ | 5.372 | $n_3$ 1.74969 |
| $r_7$ | −72.870 | $d_7$ | 11.684 | |
| $r_8$ | 67.826 | $d_8$ | 7.319 | $n_4$ 1.51508 |
| $r_9$ | −256.797 | $d_9$ | 14.054 | |
| $r_{10}$ | 112.614 | $d_{10}$ | 5.486 | $n_5$ 1.74969 |
| $r_{11}$ | −235.723 | $d_{11}$ | 6.599 | |
| $r_{12}$ | 63.720 | $d_{12}$ | 4.772 | $n_6$ 1.80094 |
| $r_{13}$ | −450.816 | $d_{13}$ | 2.825 | |
| $r_{14}$ | −88.744 | $d_{14}$ | 3.522 | $n_7$ 1.80094 |
| $r_{15}$ | 31.661 | $d_{15}$ | 2.989 | |
| $r_{16}$ | 2140.319 | $d_{16}$ | 3.520 | $n_8$ 1.80094 |
| $r_{17}$ | −96.036 | $\Sigma d$ | 106.510 | (s' = 27.343) |
| $f/r_A = f/r_3 = 0.66$, $f/r_B = f/r_8 = 0.74$, | | | | |
| $-f/r_C = -f/r_{14} = 0.56$, $f/d_D = 0.60$ | | | | |

TABLE 4

$f = 50$ mm  FNo. $= 3.0$  $2\omega = 20°$  $\lambda = 632.8$ nm

| radius of curvature | | axial distance | | refractive index |
|---|---|---|---|---|
| $r_1$ | (stop) | $d_1$ | 20.857 | |
| $r_2$ | −31.539 | $d_2$ | 2.500 | $n_1$ 1.51508 |
| $r_3$ | 105.988 | $d_3$ | 8.126 | |
| $r_4$ | −54.128 | $d_4$ | 3.503 | $n_2$ 1.51508 |
| $r_5$ | −37.151 | $d_5$ | 0.276 | |
| $r_6$ | 192.719 | $d_6$ | 5.225 | $n_3$ 1.74969 |
| $r_7$ | −81.249 | $d_7$ | 8.519 | |
| $r_8$ | 71.888 | $d_8$ | 12.730 | $n_4$ 1.51508 |
| $r_9$ | −240.080 | $d_9$ | 24.991 | |
| $r_{10}$ | 133.966 | $d_{10}$ | 2.394 | $n_5$ 1.74969 |
| $r_{11}$ | −244.943 | $d_{11}$ | 3.313 | |
| $r_{12}$ | 66.688 | $d_{12}$ | 2.232 | $n_6$ 1.80094 |
| $r_{13}$ | −1331.310 | $d_{13}$ | 6.313 | |
| $r_{14}$ | −71.862 | $d_{14}$ | 1.636 | $n_7$ 1.51508 |
| $r_{15}$ | 27.248 | $d_{15}$ | 4.000 | |
| $r_{16}$ | 289.706 | $d_{16}$ | 2.645 | $n_8$ 1.80094 |
| $r_{17}$ | −244.926 | $\Sigma d$ | 109.260 | ($s' = 19.945$) |

$f/r_A = f/r_3 = 0.47$, $f/r_B = f/r_8 = 0.70$  $-f/r_C = -f/r_{14} = 0.70$, $f/d_D = 0.57$

TABLE 5

$f = 50$ mm  FNo. $= 3.0$  $2\omega = 20°$  $\lambda = 632.8$ nm

| radius of curvature | | axial distance | | refractive index |
|---|---|---|---|---|
| $r_1$ | (stop) | $d_1$ | 33.081 | |
| $r_2$ | −25.957 | $d_2$ | 2.500 | $n_1$ 1.51508 |
| $r_3$ | " | $d_3$ | 8.304 | |
| $r_4$ | −78.759 | $d_4$ | 3.374 | $n_2$ 1.51508 |
| $r_5$ | −36.700 | $d_5$ | 0.930 | |
| $r_6$ | 528.572 | $d_6$ | 5.414 | $n_3$ 1.74969 |
| $r_7$ | −81.957 | $d_7$ | 12.862 | |
| $r_8$ | 63.416 | $d_8$ | 6.927 | $n_4$ 1.74969 |
| $r_9$ | −454.190 | $d_9$ | 14.654 | |
| $r_{10}$ | 167.864 | $d_{10}$ | 4.301 | $n_5$ 1.74969 |
| $r_{11}$ | −368.568 | $d_{11}$ | 6.236 | |
| $r_{12}$ | 61.102 | $d_{12}$ | 3.905 | $n_6$ 1.74969 |
| $r_{13}$ | 1119.207 | $d_{13}$ | 1.739 | |
| $r_{14}$ | −81.478 | $d_{14}$ | 3.130 | $n_7$ 1.74969 |
| $r_{15}$ | 29.529 | $d_{15}$ | 2.594 | |
| $r_{16}$ | 102.790 | $d_{16}$ | 3.605 | $n_8$ 1.74969 |
| $r_{17}$ | −3666.078 | $\Sigma d$ | 113.556 | ($s' = 19.278$) |

$f/r_A = f/r_3 = 0$  $f/r_B = f/r_8 = 0.79$, $-f/r_C = -f/r_{14} = 0.61$, $f/d_D = 0.62$

TABLE 6

$f = 50$ mm  FNo. $= 3.0$  $2\omega = 20°$  $\lambda = 632.8$ nm

| radius of curvature | | axial distance | | refractive index |
|---|---|---|---|---|
| $r_1$ | (stop) | $d_1$ | 18.461 | |
| $r_2$ | −29.916 | $d_2$ | 2.500 | $n_1$ 1.51508 |
| $r_3$ | 80.521 | $d_3$ | 8.849 | |
| $r_4$ | −48.446 | $d_4$ | 4.519 | $n_2$ 1.51508 |
| $r_5$ | −38.780 | $d_5$ | 0.299 | |
| $r_6$ | 216.418 | $d_6$ | 5.414 | $n_3$ 1.74969 |
| $r_7$ | −62.043 | $d_7$ | 12.630 | |
| $r_8$ | 70.049 | $d_8$ | 6.927 | $n_4$ 1.74969 |
| $r_9$ | −462.550 | $d_9$ | 18.377 | |
| $r_{10}$ | 65.961 | $d_{10}$ | 6.637 | $n_5$ 1.74969 |
| $r_{11}$ | −264.210 | $d_{11}$ | 4.405 | |
| $r_{12}$ | −93.256 | $d_{12}$ | 2.387 | $n_6$ 1.74969 |
| $r_{13}$ | 32.887 | $d_{13}$ | 5.313 | |
| $r_{14}$ | 179.107 | $d_{14}$ | 2.580 | $n_7$ 1.74969 |
| $r_{15}$ | −76.677 | $\Sigma d$ | 99.298 | ($s' = 28.312$) |

$f/r_A = f/r_3 = 0.62$, $f/r_B = f/r_8 = 0.81$, $-f/r_C = -f/r_{12} = 0.54$, $f/d_D = 0.62$

TABLE 7

$f = 50$ mm  FNo. $= 3.0$  $2\omega = 20°$  $\lambda = 632.8$ nm

| radius of curvature | | axial distance | | refractive index |
|---|---|---|---|---|
| $r_1$ | (stop) | $d_1$ | 20.420 | |

TABLE 7-continued $f = 50$ mm  FNo. $= 3.0$  $2\omega = 20°$  $\lambda = 632.8$ nm

| radius of curvature | | axial distance | | refractive index |
|---|---|---|---|---|
| $r_2$ | −29.253 | $d_2$ | 2.500 | $n_1$ 1.51508 |
| $r_3$ | 81.494 | $d_3$ | 5.820 | |
| $r_4$ | −56.324 | $d_4$ | 7.408 | $n_2$ 1.51508 |
| $r_5$ | −39.509 | $d_5$ | 0.012 | |
| $r_6$ | 115.612 | $d_6$ | 5.414 | $n_3$ 1.51508 |
| $r_7$ | −54.138 | $d_7$ | 9.995 | |
| $r_8$ | 57.246 | $d_8$ | 6.927 | $n_4$ 1.61052 |
| $r_9$ | −292.997 | $d_9$ | 16.896 | |
| $r_{10}$ | 67.687 | $d_{10}$ | 6.637 | $n_5$ 1.74969 |
| $r_{11}$ | −350.764 | $d_{11}$ | 3.153 | |
| $r_{12}$ | −74.159 | $d_{12}$ | 2.387 | $n_6$ 1.51508 |
| $r_{13}$ | 28.396 | $d_{13}$ | 4.811 | |
| $r_{14}$ | 229.052 | $d_{14}$ | 2.580 | $n_7$ 1.74969 |
| $r_{15}$ | −103.592 | $\Sigma d$ | 94.960 | ($s' = 31.563$) |

$f/r_A = f/r_3 = 0.61$, $f/r_B = f/r_8 = 0.87$, $-f/r_C = -f/r_{12} = 0.67$, $f/d_D = 0.67$

TABLE 8

$f = 50$ mm  FNo. $= 3.0$  $2\omega = 20°$  $\lambda = 632.8$ nm

| radius of curvature | | axial distance | | refractive index |
|---|---|---|---|---|
| $r_1$ | (stop) | $d_1$ | 18.387 | |
| $r_2$ | −28.368 | $d_2$ | 2.489 | $n_1$ 1.51508 |
| $r_3$ | 71.718 | $d_3$ | 6.889 | |
| $r_4$ | −53.394 | $d_4$ | 9.714 | $n_2$ 1.51508 |
| $r_5$ | −39.242 | $d_5$ | 0.012 | |
| $r_6$ | 141.442 | $d_6$ | 6.156 | $n_3$ 1.51508 |
| $r_7$ | −52.965 | $d_7$ | 10.082 | |
| $r_8$ | 53.299 | $d_8$ | 6.927 | $n_4$ 1.74969 |
| $r_9$ | −386.460 | $d_9$ | 18.525 | |
| $r_{10}$ | 57.416 | $d_{10}$ | 6.637 | $n_5$ 1.51508 |
| $r_{11}$ | −224.512 | $d_{11}$ | 1.500 | |
| $r_{12}$ | −67.889 | $d_{12}$ | 2.387 | $n_6$ 1.80094 |
| $r_{13}$ | 34.006 | $d_{13}$ | 6.638 | |
| $r_{14}$ | 200.683 | $d_{14}$ | 2.800 | $n_7$ 1.74969 |
| $r_{15}$ | −61.727 | $\Sigma d$ | 99.143 | ($s' = 30.167$) |

$f/r_A = f/r_3 = 0.70$, $f/r_B = f/r_8 = 0.94$, $-f/r_C = -f/r_{12} = 0.74$, $f/d_D = 0.62$

TABLE 9

$f = 50$ mm  FNo. $= 3.0$  $2\omega = 20°$  $\lambda = 632.8$ nm

| radius of curvature | | axial distance | | refractive index |
|---|---|---|---|---|
| $r_1$ | (stop) | $d_1$ | 22.258 | |
| $r_2$ | −27.716 | $d_2$ | 2.444 | $n_1$ 1.51508 |
| $r_3$ | 103.345 | $d_3$ | 9.000 | |
| $r_4$ | −65.055 | $d_4$ | 4.222 | $n_2$ 1.51508 |
| $r_5$ | −43.803 | $d_5$ | 0.333 | |
| $r_6$ | 310.922 | $d_6$ | 5.556 | $n_3$ 1.74969 |
| $r_7$ | −56.436 | $d_7$ | 12.556 | |
| $r_8$ | 63.645 | $d_8$ | 6.889 | $n_4$ 1.74969 |
| $r_9$ | −805.257 | $d_9$ | 16.289 | |
| $r_{10}$ | 87.374 | $d_{10}$ | 6.667 | $n_5$ 1.74969 |
| $r_{11}$ | ∞ | $d_{11}$ | 6.489 | |
| $r_{12}$ | −100.649 | $d_{12}$ | 2.333 | $n_6$ 1.74969 |
| $r_{13}$ | 33.706 | $d_{13}$ | 2.556 | |
| $r_{14}$ | 104.231 | $d_{14}$ | 3.556 | $n_7$ 1.74969 |
| $r_{15}$ | −79.194 | $\Sigma d$ | 101.148 | ($s' = 26.909$) |

$f/r_A = f/r_3 = 0.48$, $f/r_B = f/r_8 = 0.79$, $-f/r_C = -f/r_{12} = 0.50$, $f/d_D = 0.63$

TABLE 10

$f = 50$ mm  FNo. $= 3.0$  $2\omega = 20°$  $\lambda = 632.8$ nm

| radius of curvature | | axial distance | | refractive index |
|---|---|---|---|---|
| $r_1$ | (stop) | $d_1$ | 23.057 | |
| $r_2$ | −26.862 | $d_2$ | 2.444 | $n_1$ 1.51508 |
| $r_3$ | 102.079 | $d_3$ | 9.000 | |

TABLE 10-continued

FNo. = 3.0
f = 50 mm   2ω = 20°   λ = 632.8 nm
radius of curvature | axial distance | refractive index

| | radius of curvature | | axial distance | | refractive index |
|---|---|---|---|---|---|
| $r_4$ | −117.212 | $d_4$ | 5.543 | $n_2$ | 1.51508 |
| $r_5$ | −51.567 | $d_5$ | 0.401 | | |
| $r_6$ | 375.326 | $d_6$ | 5.730 | $n_3$ | 1.74969 |
| $r_7$ | −51.644 | $d_7$ | 11.423 | | |
| $r_8$ | 62.379 | $d_8$ | 7.274 | $n_4$ | 1.74969 |
| $r_9$ | 195.408 | $d_9$ | 17.876 | | |
| $r_{10}$ | 63.504 | $d_{10}$ | 6.667 | $n_5$ | 1.74969 |
| $r_{11}$ | 209.685 | $d_{11}$ | 7.301 | | |
| $r_{12}$ | ∞ | $d_{12}$ | 3.500 | $n_6$ | 1.74969 |
| $r_{13}$ | 28.934 | $d_{13}$ | 2.000 | | |
| $r_{14}$ | 57.507 | $d_{14}$ | 3.556 | $n_7$ | 1.74969 |
| $r_{15}$ | −261.844 | Σd | 105.772 | | (s' = 24.888) |

$f/r_A = f/r_3 = 0.49$, $f/r_B = f/r_6 = 0.80$, $-f/r_C = -f/r_{12} = 0$, $f/d_D = 0.60$

TABLE 11

FNo. = 3.0
f = 50 mm   2ω = 20°   λ = 632.8 nm

| | radius of curvature | | axial distance | | refractive index |
|---|---|---|---|---|---|
| $r_1$ | (stop) | $d_1$ | 23.594 | | |
| $r_2$ | −27.750 | $d_2$ | 2.444 | $n_1$ | 1.51508 |
| $r_3$ | 128.499 | $d_3$ | 9.000 | | |
| $r_4$ | −80.501 | $d_4$ | 4.222 | $n_2$ | 1.51508 |
| $r_5$ | −46.164 | $d_5$ | 0.333 | | |
| $r_6$ | ∞ | $d_6$ | 5.556 | $n_3$ | 1.74969 |
| $r_7$ | −54.852 | $d_7$ | 12.556 | | |
| $r_8$ | 55.331 | $d_8$ | 6.889 | $n_4$ | 1.74969 |
| $r_9$ | ∞ | $d_9$ | 16.720 | | |
| $r_{10}$ | 97.955 | $d_{10}$ | 6.667 | $n_5$ | 1.74969 |
| $r_{11}$ | −187.259 | $d_{11}$ | 5.656 | | |
| $r_{12}$ | −70.601 | $d_{12}$ | 2.333 | $n_6$ | 1.74969 |
| $r_{13}$ | 33.075 | $d_{13}$ | 2.494 | | |
| $r_{14}$ | 100.999 | $d_{14}$ | 3.556 | $n_7$ | 1.74969 |
| $r_{15}$ | −86.274 | Σd | 102.020 | | (s' = 26.411) |

$f/r_A = f/r_3 = 0.39$, $f/r_B = f/r_8 = 0.9$, $-f/r_C = -f/r_{12} = 0.71$, $f/d_D = 0.64$

TABLE 12

FNo. = 3.0
f = 50 mm   2ω = 20°   λ = 632.8 nm

| | radius of curvature | | axial distance | | refractive index |
|---|---|---|---|---|---|
| $r_1$ | (stop) | $d_1$ | 20.176 | | |
| $r_2$ | −40.250 | $d_2$ | 2.498 | $n_1$ | 1.51508 |
| $r_3$ | 53.272 | $d_3$ | 10.296 | | |
| $r_4$ | 123.449 | $d_4$ | 5.153 | $n_2$ | 1.74969 |
| $r_5$ | −72.065 | $d_5$ | 15.676 | | |
| $r_6$ | 69.492 | $d_6$ | 11.147 | $n_3$ | 1.74969 |
| $r_7$ | −398.267 | $d_7$ | 21.180 | | |
| $r_8$ | 129.717 | $d_8$ | 5.450 | $n_4$ | 1.74969 |
| $r_9$ | −227.550 | $d_9$ | 2.402 | | |
| $r_{10}$ | 56.615 | $d_{10}$ | 8.334 | $n_5$ | 1.74969 |
| $r_{11}$ | −2234.934 | $d_{11}$ | 2.300 | | |
| $r_{12}$ | −62.389 | $d_{12}$ | 2.913 | $n_6$ | 1.74969 |
| $r_{13}$ | 32.672 | $d_{13}$ | 4.948 | | |
| $r_{14}$ | 65.931 | $d_{14}$ | 3.657 | $n_7$ | 1.74969 |
| $r_{15}$ | 667.179 | Σd | 116.130 | | (s' = 19.952) |

$f/r_A = f/r_3 = 0.94$, $f/r_B = f/r_6 = 0.72$, $-f/r_C = -f/r_{12} = 0.80$, $f/d_D = 0.52$

TABLE 13

FNo. = 3.0
f = 50 mm   2ω = 20°   λ = 632.8 nm

| | radius of curvature | | axial distance | | refractive index |
|---|---|---|---|---|---|
| $r_1$ | (stop) | $d_1$ | 15.269 | | |
| $r_2$ | −33.434 | $d_2$ | 2.502 | $n_1$ | 1.51508 |
| $r_3$ | 54.783 | $d_3$ | 11.645 | | |
| $r_4$ | 315.383 | $d_4$ | 5.024 | $n_2$ | 1.74969 |

TABLE 13-continued

FNo. = 3.0
f = 50 mm   2ω = 20°   λ = 632.8 nm

| | radius of curvature | | axial distance | | refractive index |
|---|---|---|---|---|---|
| $r_5$ | −52.630 | $d_5$ | 13.575 | | |
| $r_6$ | 71.581 | $d_6$ | 5.957 | $n_3$ | 1.74969 |
| $r_7$ | −193.478 | $d_7$ | 22.548 | | |
| $r_8$ | 61.869 | $d_8$ | 4.769 | $n_4$ | 1.74969 |
| $r_9$ | −237.209 | $d_9$ | 6.500 | | |
| $r_{10}$ | −68.707 | $d_{10}$ | 1.615 | $n_5$ | 1.74969 |
| $r_{11}$ | 33.684 | $d_{11}$ | 4.623 | | |
| $r_{12}$ | 104.760 | $d_{12}$ | 3.623 | $n_6$ | 1.74969 |
| $r_{13}$ | −81.195 | Σd | 97.950 | | (s' = 28.545) |

$f/r_A = f/r_3 = 0.91$, $f/r_B = f/r_6 = 0.70$, $-f/r_C = -f/r_{10} = 0.73$, $f/d_D = 0.60$

TABLE 14

FNo. = 3.0
f = 50 mm   2ω = 20°   λ = 632.8 nm

| | radius of curvature | | axial distance | | refractive index |
|---|---|---|---|---|---|
| $r_1$ | (stop) | $d_1$ | 13.604 | | |
| $r_2$ | −30.055 | $d_2$ | 2.502 | $n_1$ | 1.51508 |
| $r_3$ | 56.761 | $d_3$ | 11.509 | | |
| $r_4$ | 243.775 | $d_4$ | 5.924 | $n_2$ | 1.51508 |
| $r_5$ | −37.990 | $d_5$ | 10.049 | | |
| $r_6$ | 72.876 | $d_6$ | 7.555 | $n_3$ | 1.51508 |
| $r_7$ | −103.442 | $d_7$ | 22.709 | | |
| $r_8$ | 50.111 | $d_8$ | 12.000 | $n_4$ | 1.80094 |
| $r_9$ | −191.063 | $d_9$ | 4.763 | | |
| $r_{10}$ | −76.937 | $d_{10}$ | 13.683 | $n_5$ | 1.80094 |
| $r_{11}$ | 29.161 | $d_{11}$ | 7.487 | | |
| $r_{12}$ | 75.759 | $d_{12}$ | 3.000 | $n_6$ | 1.80094 |
| $r_{13}$ | −118.897 | Σd | 114.785 | | (s' = 21.652) |

$f/r_A = f/r_3 = 0.88$, $f/r_B = f/r_6 = 0.69$, $-f/r_C = -f/r_{10} = 0.65$, $f/d_D = 0.49$

TABLE 15 f = 50 mm  FNo. = 3.0  2ω = 20°  λ = 632.8 nm

| | radius of curvature | | axial distance | | refractive index |
|---|---|---|---|---|---|
| $r_1$ | (stop) | | | | |
| | | $d_1$ | 22.617 | | |
| $r_2$ | −33.207 | | | | |
| | | $d_2$ | 2.500 | $n_1$ | 1.74969 |
| $r_3$ | 78.287 | | | | |
| | | $d_3$ | 9.419 | | |
| $r_4$ | 671.114 | | | | |
| | | $d_4$ | 5.664 | $n_1$ | 1.74969 |
| $r_5$ | −48.067 | | | | |
| | | $d_5$ | 4.171 | | |
| $r_6$ | 62.808 | | | | |
| | | $d_6$ | 11.055 | $n_3$ | 1.80094 |
| $r_7$ | −130.359 | | | | |
| | | $d_7$ | 20.203 | | |
| $r_8$ | 69.332 | | | | |
| | | $d_8$ | 5.911 | $n_4$ | 1.80094 |
| $r_9$ | −105.416 | | | | |
| | | $d_9$ | 1.500 | | |
| $r_{10}$ | −54.193 | | | | |
| | | $d_{10}$ | 11.224 | $n_5$ | 1.80094 |
| $r_{11}$ | 34.186 | | | | |
| | | $d_{11}$ | 1.980 | | |
| $r_{12}$ | 76.402 | | | | |
| | | $d_{12}$ | 3.623 | $n_6$ | 1.80094 |
| $r_{13}$ | −120.484 | | | | |
| | | Σd | 99.867 | | (s' = 33.357) |

$f/r_A = f/r_3 = 0.64$, $f/r_B = f/r_6 = 0.80$, $-f/r_C = -f/r_{10} = 0.92$, $f/d_D = 0.65$

TABLE 16

$f = 50$ mm  FNo. $= 3.0$  $2\omega = 20°$  $\lambda = 632.8$ nm

| | radius of curvature | | axial distance | refractive index |
|---|---|---|---|---|
| $r_1$ | (stop) | | | |
| | | $d_1$ | 16.408 | |
| $r_2$ | −33.031 | | | |
| | | $d_2$ | 2.502 | $n_1$ 1.51508 |
| $r_3$ | 56.070 | | | |
| | | $d_3$ | 11.187 | |
| $r_4$ | 209.177 | | | |
| | | $d_4$ | 5.251 | $n_2$ 1.74969 |
| $r_5$ | −50.166 | | | |
| | | $d_5$ | 13.606 | |
| $r_6$ | 66.646 | | | |
| | | $d_6$ | 15.412 | $n_3$ 1.61052 |
| $r_7$ | −187.673 | | | |
| | | $d_7$ | 26.245 | |
| $r_8$ | 55.420 | | | |
| | | $d_8$ | 8.189 | $n_4$ 1.80094 |
| $r_9$ | −228.445 | | | |
| | | $d_9$ | 5.372 | |
| $r_{10}$ | −57.786 | | | |
| | | $d_{10}$ | 2.427 | $n_5$ 1.74969 |
| $r_{11}$ | 34.122 | | | |
| | | $d_{11}$ | 4.298 | |
| $r_{12}$ | 90.415 | | | |
| | | $d_{12}$ | 1.600 | $n_6$ 1.80094 |
| $r_{13}$ | −117.172 | | | |
| | $\Sigma d$ | | 112.497 | ($s' = 20.395$) |

$f/r_A = f/r_3 = 0.89$, $f/r_B = f/r_6 = 0.75$,
$-f/r_C = -f/r_{10} = 0.87$, $f/d_D = 0.52$

TABLE 17

$f_M = 45$ mm  $\beta_M = 0$  FNo.$_M = 3.0$  $2\omega_M = 20°$  $f_S = 23.377$ mm
$\beta_S = -0.542$ eff. FNo.$_S = 3.0$  $\lambda = 632.8$ nm

| | radius of curvature | | axial distance | refractive index |
|---|---|---|---|---|
| $r_1$ | (stop) | | | |
| | | $d_1$ | 19.315 | |
| $r_2$ | −97.975 | | | |
| | | $d_2$ | 2.700 | $n_1$ 1.51508 |
| $r_3$ | −61.386 | | | |
| | | $d_3$ | 2.250 | |
| $r_4$ | −25.874 | | | |
| | | $d_4$ | 2.250 | $n_2$ 1.51508 |
| $r_5$ | 72.959 | | | |
| | | $d_5$ | 8.820 | |
| $r_6$ | −108.969 | | | |
| | | $d_6$ | 3.420 | $n_3$ 1.51508 |
| $r_7$ | −45.915 | | | |
| | | $d_7$ | 0.900 | |
| $r_8$ | 210.485 | | | |
| | | $d_8$ | 4.950 | $n_4$ 1.74969 |
| $r_9$ | −97.896 | | | |
| | | $d_9$ | 10.620 | |
| $r_{10}$ | 65.872 | | | |
| | | $d_{10}$ | 4.950 | $n_5$ 1.74969 |
| $r_{11}$ | −365.730 | | | |
| | | $d_{11}$ | 9.360 | |
| $r_{12M}$ | 195.436 | | | |
| $r_{12S}$ | 84.044 | | | |
| | | $d_{12}$ | 3.600 | $n_6$ 1.74969 |
| $r_{13M}$ | −215.081 | | | |
| $r_{13S}$ | −279.925 | | | |
| | | $d_{13}$ | 1.620 | |
| $r_{14}$ | 61.424 | | | |
| | | $d_{14}$ | 3.240 | $n_7$ 1.74969 |
| $r_{15}$ | −498.490 | | | |
| | | $d_{15}$ | 3.780 | |
| $r_{16}$ | −85.375 | | | |
| | | $d_{16}$ | 2.520 | $n_8$ 1.74969 |
| $r_{17}$ | 26.766 | | | |
| | | $d_{17}$ | 3.780 | |
| $r_{18}$ | 291.012 | | | |
| | | $d_{18}$ | 3.780 | $n_9$ 1.74969 |
| $r_{19}$ | −126.216 | | | |
| | | $d_{19}$ | 3.000 | |
| $r_{20M}$ | ∞ | | | |
| $r_{20S}$ | 32.604 | | | |

TABLE 17-continued $f_M = 45$ mm  $\beta_M = 0$  FNo.$_M = 3.0$  $2\omega_M = 20°$  $f_S = 23.377$ mm
$\beta_S = -0.542$ eff. FNo.$_S = 3.0$  $\lambda = 632.8$ nm

| | radius of curvature | | axial distance | refractive index |
|---|---|---|---|---|
| | | $d_{20}$ | 3.000 | $n_{10}$ 1.80094 |
| $r_{21M}$ | ∞ | | | |
| $r_{21S}$ | 129.969 | | | |
| | | $d_{21}$ | 1.000 | |
| $r_{22M}$ | ∞ | | | |
| $r_{22S}$ | 14.988 | | | |
| | | $d_{22}$ | 3.000 | $n_{11}$ 1.80094 |
| $r_{23M}$ | ∞ | | | |
| $r_{23S}$ | 21.604 | | | |
| | $\Sigma d$ | | 101.855 | ($s' = 17.453$) |

$f_M/r_A = f_M/r_5 = 0.62$, $f_M/r_B = f_M/r_{10} = 0.68$,
$-f_M/r_C = -f_M/r_{16} = 0.53$, $f_M/d_D = 0.55$

TABLE 18

$f_M = 45$ mm  $\beta_M = 0$  FNo.$_M = 3.0$  $2\omega_M = 20°$  $f_S = 22.066$ mm
$\beta_S = -0.532$ eff. FNo.$_S = 3.0$  $\lambda = 632.8$ nm

| | radius of curvature | | axial distance | refractive index |
|---|---|---|---|---|
| $r_1$ | (stop) | | | |
| | | $d_1$ | 29.773 | |
| $r_2$ | −23.362 | | | |
| | | $d_2$ | 2.250 | $n_1$ 1.51508 |
| $r_3$ | ∞ | | | |
| | | $d_3$ | 7.473 | |
| $r_4$ | −70.883 | | | |
| | | $d_4$ | 3.037 | $n_2$ 1.51508 |
| $r_5$ | −33.030 | | | |
| | | $d_5$ | 0.837 | |
| $r_6$ | 475.715 | | | |
| | | $d_6$ | 4.872 | $n_3$ 1.74969 |
| $r_7$ | −73.761 | | | |
| | | $d_7$ | 11.576 | |
| $r_8$ | 57.075 | | | |
| | | $d_8$ | 6.234 | $n_4$ 1.74969 |
| $r_9$ | −408.771 | | | |
| | | $d_9$ | 13.188 | |
| $r_{10M}$ | 151.078 | | | |
| $r_{10S}$ | 46.037 | | | |
| | | $d_{10}$ | 3.871 | $n_5$ 1.74969 |
| $r_{11M}$ | −331.711 | | | |
| $r_{11S}$ | 637.906 | | | |
| | | $d_{11}$ | 5.613 | |
| $r_{12}$ | 54.992 | | | |
| | | $d_{12}$ | 3.514 | $n_6$ 1.74969 |
| $r_{13}$ | 1007.283 | | | |
| | | $d_{13}$ | 1.565 | |
| $r_{14}$ | −73.330 | | | |
| | | $d_{14}$ | 2.817 | $n_7$ 1.74969 |
| $r_{15}$ | 26.576 | | | |
| | | $d_{15}$ | 2.355 | |
| $r_{16}$ | 92.511 | | | |
| | | $d_{16}$ | 3.244 | $n_8$ 1.74969 |
| $r_{17}$ | −3299.459 | | | |
| | | $d_{17}$ | 1.000 | |
| $r_{18M}$ | ∞ | | | |
| $r_{18S}$ | 10.223 | | | |
| | | $d_{18}$ | 3.068 | $n_9$ 1.80094 |
| $r_{19M}$ | ∞ | | | |
| $r_{19S}$ | −366.741 | | | |
| | | $d_{19}$ | 0.500 | $n_{10}$ 1.80094 |
| $r_{20M}$ | ∞ | | | |
| $r_{20S}$ | −59.919 | | | |
| | | $d_{20}$ | 3.000 | |
| $r_{21M}$ | ∞ | | | |
| $r_{21S}$ | 15.318 | | | |
| | $\Sigma d$ | | 109.767 | ($s' = 12.481$) |

$f_M/r_A = f_M/r_3 = 0$, $f_M/r_B = f_M/r_8 = 0.79$,
$-f_M/r_C = -f_M/r_{14} = 0.61$, $f_M/d_D = 0.56$

TABLE 19

$f_M = 45$ mm $\beta_M = 0$ FNo.$_M = 3.0$ $2\omega_M = 20°$ $f_S = 24.295$ mm
$\beta_S = -0.468$ eff. FNo.$_S = 3.0$ $\lambda = 632.8$ nm

| | radius of curvature | axial distance | refractive index |
|---|---|---|---|
| $r_1$ | (stop) | | |
| | | $d_1$ 18.246 | |
| $r_2$ | −36.446 | | |
| | | $d_2$ 2.248 | $n_1$ 1.51508 |
| $r_3$ | 46.000 | | |
| | | $d_3$ 9.267 | |
| $r_4$ | 102.587 | | |
| | | $d_4$ 4.637 | $n_2$ 1.74969 |
| $r_5$ | −65.479 | | |
| | | $d_5$ 14.111 | |
| $r_6$ | 63.493 | | |
| | | $d_6$ 10.032 | $n_3$ 1.74969 |
| $r_7$ | 366.156 | | |
| | | $d_7$ 19.044 | |
| $r_{8M}$ | 117.938 | | |
| $r_{8S}$ | 51.204 | | |
| | | $d_8$ 4.905 | $n_4$ 1.74969 |
| $r_9$ | −205.162 | | |
| | | $d_9$ 2.153 | |
| $r_{10}$ | 50.710 | | |
| | | $d_{10}$ 7.501 | $n_5$ 1.74969 |
| $r_{11}$ | −915.642 | | |
| | | $d_{11}$ 2.064 | |
| $r_{12}$ | −55.476 | | |
| | | $d_{12}$ 2.622 | $n_6$ 1.74969 |
| $r_{13}$ | 29.374 | | |
| | | $d_{13}$ 4.474 | |
| $r_{14}$ | 59.383 | | |
| | | $d_{14}$ 3.291 | $n_7$ 1.74969 |
| $r_{15}$ | 510.189 | | |
| | | $d_{15}$ 2.999 | |
| $r_{16M}$ | ∞ | | |
| $r_{16S}$ | 11.545 | | |
| | | $d_{16}$ 3.568 | $n_8$ 1.80094 |
| $r_{17M}$ | ∞ | | |
| $r_{17S}$ | −434.346 | | |
| | | $d_{17}$ 0.500 | |
| $r_{18M}$ | ∞ | | |
| $r_{18S}$ | −46.420 | | |
| | | $d_{18}$ 3.000 | $n_9$ 1.80094 |
| $r_{19M}$ | ∞ | | |
| $r_{19S}$ | 47.690 | | |
| | $\Sigma d$ 114.662 | | (s' = 10.827) |

$f_M/r_A = f_M/r_3 = 0.98$, $f_M/r_B = f_M/r_6 = 0.71$,
$-f_M/r_C = -f_M/r_{12} = 0.81$, $f_M/d_D = 0.47$

TABLE 20

$f_M = 45$ mm $\beta_M = 0$ FNo.$_M = 3.0$ $2\omega_M = 20°$ $f_S = 24.732$ mm
$\beta_S = -0.603$ eff. FNo.$_S = 3.0$ $\lambda = 632.8$ nm

| | radius of curvature | axial distance | refractive index |
|---|---|---|---|
| $r_1$ | (stop) | | |
| | | $d_1$ 19.584 | |
| $r_2$ | −26.576 | | |
| | | $d_2$ 2.200 | $n_1$ 1.51508 |
| $r_3$ | 81.049 | | |
| | | $d_3$ 7.887 | |
| $r_4$ | −53.686 | | |
| | | $d_4$ 3.603 | $n_2$ 1.51508 |
| $r_5$ | −39.508 | | |
| | | $d_5$ 0.210 | |
| $r_6$ | 261.764 | | |
| | | $d_6$ 4.971 | $n_3$ 1.74969 |
| $r_7$ | −53.080 | | |
| | | $d_7$ 12.149 | |
| $r_{8M}$ | 56.597 | | |
| $r_{8S}$ | 108.403 | | |
| | | $d_8$ 7.108 | $n_4$ 1.69584 |
| $r_{9M}$ | −901.575 | | |
| $r_{9S}$ | −54.694 | | |
| | | $d_9$ 14.746 | |
| $r_{10}$ | 64.128 | | |
| | | $d_{10}$ 6.579 | $n_5$ 1.80094 |
| $r_{11}$ | −181.756 | | |
| | | $d_{11}$ 5.399 | |

TABLE 20-continued $f_M = 45$ mm $\beta_M = 0$ FNo.$_M = 3.0$ $2\omega_M = 20°$ $f_S = 24.732$ mm
$\beta_S = -0.603$ eff. FNo.$_S = 3.0$ $\lambda = 632.8$ nm

| | radius of curvature | axial distance | refractive index |
|---|---|---|---|
| $r_{12}$ | −71.968 | | |
| | | $d_{12}$ 2.180 | $n_6$ 1.80094 |
| $r_{13}$ | 31.121 | | |
| | | $d_{13}$ 2.317 | |
| $r_{14}$ | 110.960 | | |
| | | $d_{14}$ 3.410 | $n_7$ 1.80094 |
| $r_{15}$ | 85.678 | | |
| | | $d_{15}$ 5.007 | |
| $r_{16M}$ | ∞ | | |
| $r_{16S}$ | 14.275 | | |
| | | $d_{16}$ 3.068 | $n_8$ 1.80094 |
| $r_{17M}$ | ∞ | | |
| $r_{17S}$ | −902.528 | | |
| | | $d_{17}$ 0.500 | |
| $r_{18M}$ | ∞ | | |
| $r_{18S}$ | −63.714 | | |
| | | $d_{18}$ 3.000 | $n_9$ 1.80094 |
| $r_{19M}$ | ∞ | | |
| $r_{19S}$ | 60.562 | | |
| | $\Sigma d$ 103.918 | | (s' = 16.105) |

$f_M/r_A = f_M/r_3 = 0.56$, $f_M/r_B = f_M/r_{8M} = 0.80$,
$-f_M/r_C = -f_M/r_{12} = 0.63$, $f_M/d_D = 0.53$

TABLE 21

$f_M = 45$ mm $\beta_M = 0$ FNo.$_M = 3.0$ $2\omega_M = 20°$ $f_S = 23.374$ mm
$\beta_S = -0.703$ eff. FNo.$_S = 3.0$ $\lambda = 632.8$ nm

| | radius of curvature | axial distance | refractive index |
|---|---|---|---|
| $r_1$ | (stop) | | |
| $r_2$ | −29.886 | | |
| | | $d_2$ 2.250 | $n_1$ 1.74969 |
| $r_3$ | 70.459 | | |
| | | $d_3$ 8.477 | |
| $r_4$ | 604.003 | | |
| | | $d_4$ 5.097 | $n_2$ 1.74969 |
| $r_5$ | −43.260 | | |
| | | $d_5$ 3.754 | |
| $r_{6M}$ | 56.527 | | |
| $r_{6S}$ | 49.459 | | |
| | | $d_6$ 9.950 | $n_3$ 1.80094 |
| $r_7$ | −117.323 | | |
| | | $d_7$ 18.182 | |
| $r_{8M}$ | 62.399 | | |
| $r_{8S}$ | 67.203 | | |
| | | $d_8$ 5.320 | $n_4$ 1.80094 |
| $r_9$ | −94.875 | | |
| | | $d_9$ 1.350 | |
| $r_{10}$ | −48.774 | | |
| | | $d_9$ 10.101 | $n_5$ 1.80094 |
| $r_{11}$ | 30.767 | | |
| | | $d_{11}$ 1.782 | |
| $r_{12}$ | 68.762 | | |
| | | $d_{12}$ 3.261 | $n_6$ 1.80094 |
| $r_{13}$ | −108.436 | | |
| | | $d_{13}$ 2.000 | |
| $r_{14M}$ | ∞ | | |
| $r_{14S}$ | 15.109 | | |
| | | $d_{14}$ 4.000 | $n_7$ 1.80094 |
| $r_{15M}$ | ∞ | | |
| $r_{15S}$ | 202.535 | | |
| | | $d_{15}$ 0.500 | |
| $r_{16M}$ | ∞ | | |
| $r_{16S}$ | −57.768 | | |
| | | $d_{16}$ 3.000 | $n_8$ 1.80094 |
| $r_{17M}$ | ∞ | | |
| $r_{17S}$ | 102.417 | | |
| | $\Sigma d$ 99.379 | | (s' = 23.635) |

$f_M/r_A = f_M/r_3 = 0.64$, $f_M/r_B = f_M/r_{6M} = 0.80$,
$-f_M/r_C = -f_M/r_{10} = 0.92$, $f_M/d_D = 0.57$

TABLE 22

$f_M = 45$ mm $\beta_M = 0$ FNo.$_M = 3.0$ $2\omega_M = 20°$ $f_S = 24.286$ mm
$\beta_S = -0.598$ eff.FNo.$_S = 3.0$ $\lambda = 632.8$ nm

| radius of curvature | axial distance | refractive index |
|---|---|---|
| $r_1$ (stop) | $d_1$ 19.036 | |
| $r_2$ −24.665 | $d_2$ 2.200 | $n_1$ 1.51508 |
| $r_3$ 80.119 | $d_3$ 8.100 | |
| $r_4$ −53.813 | $d_4$ 3.800 | $n_2$ 1.51508 |
| $r_5$ −39.341 | $d_5$ 0.300 | |
| $r_6$ 274.477 | $d_6$ 5.000 | $n_3$ 1.74969 |
| $r_7$ −53.063 | $d_7$ 11.300 | |
| $r_8$ 57.405 | $d_8$ 6.200 | $n_4$ 1.74969 |
| $r_9$ −1009.601 | $d_9$ 3.700 | |
| $r_{10M}$ ∞ | | |
| $r_{10S}$ 51.108 | $d_{10}$ 4.000 | $n_5$ 1.51508 |
| $r_{11}$ ∞ | $d_{11}$ 2.000 | |
| $r_{12M}$ ∞ | | |
| $r_{12S}$ −73.201 | $d_{12}$ 4.000 | $n_6$ 1.51508 |
| $r_{13}$ ∞ | $d_{13}$ 3.700 | |
| $r_{14}$ 79.483 | $d_{14}$ 6.000 | $n_7$ 1.74969 |
| $r_{15}$ −191.221 | $d_{15}$ 5.840 | |
| $r_{16}$ −70.410 | $d_{16}$ 2.100 | $n_8$ 1.74969 |
| $r_{17}$ 31.151 | $d_{17}$ 2.300 | |
| $r_{18}$ 107.494 | $d_{18}$ 3.200 | $n_9$ 1.74969 |
| $r_{19}$ −69.424 | $d_{19}$ 3.000 | |
| $r_{20M}$ ∞ | | |
| $r_{20S}$ 28.074 | $d_{20}$ 3.000 | $n_{10}$ 1.80094 |
| $r_{21M}$ ∞ | | |
| $r_{21S}$ 106.862 | $d_{21}$ 1.000 | |
| $r_{22M}$ ∞ | | |
| $r_{22S}$ 13.797 | $d_{22}$ 3.000 | $n_{11}$ 1.80094 |
| $r_{23M}$ ∞ | | |
| $r_{23S}$ 16.424 | $\Sigma d$ 102.776 | ($s' = 18.387$) |

$f_M/r_A = f_M/r_3 = 0.56$, $f_M/r_B = f_M/r_8 = 0.78$,
$-f_M/r_C = -f_M/r_{16} = 0.64$, $f_M/d_D = 0.54$

TABLE 23

$f_M = 45$ mm $\beta_M = 0$ FNo.$_M = 3.0$ $2\omega_M = 20°$ $f_S = 24.993$ mm
$\beta_S = -0.698$ eff.FNo.$_S = 3.0$ $\lambda = 632.8$ nm

| radius of curvature | axial distance | refractive index |
|---|---|---|
| $r_1$ (stop) | $d_1$ 18.378 | |
| $r_2$ −26.328 | $d_2$ 2.250 | $n_1$ 1.51508 |
| $r_3$ 73.344 | $d_3$ 5.238 | |
| $r_4$ −50.692 | $d_4$ 6.667 | $n_2$ 1.51508 |
| $r_5$ −35.558 | $d_5$ 0.011 | |
| $r_6$ 104.051 | $d_6$ 4.872 | $n_3$ 1.51508 |
| $r_7$ −48.724 | $d_7$ 5.000 | |
| $r_{8M}$ ∞ | | |
| $r_{8S}$ −37.970 | $d_8$ 3.000 | $n_4$ 1.74969 |
| $r_{9M}$ ∞ | | |
| $r_{9S}$ −26.699 | $d_9$ 2.280 | |
| $r_{10}$ 51.521 | $d_{10}$ 6.234 | $n_5$ 1.61052 |
| $r_{11}$ −263.698 | $d_{11}$ 7.500 | |
| $r_{12M}$ ∞ | | |
| $r_{12S}$ −24.676 | $d_{12}$ 3.000 | $n_6$ 1.80094 |
| $r_{13M}$ ∞ | | |
| $r_{13S}$ −30.747 | $d_{13}$ 6.040 | |
| $r_{14}$ 60.918 | $d_{14}$ 5.973 | $n_7$ 1.74969 |
| $r_{15}$ −315.687 | $d_{15}$ 2.838 | |
| $r_{16}$ −66.743 | $d_{16}$ 2.149 | $n_8$ 1.51508 |
| $r_{17}$ 25.557 | $d_{17}$ 4.330 | |
| $r_{18}$ 206.147 | $d_{18}$ 2.322 | $n_9$ 1.74969 |
| $r_{19}$ −93.233 | $d_{19}$ 3.000 | |
| $r_{20M}$ ∞ | | |
| $r_{20S}$ 17.139 | $d_{20}$ 4.005 | $n_{10}$ 1.80094 |
| $r_{21M}$ ∞ | | |
| $r_{21S}$ 46.857 | $\Sigma d$ 95.087 | ($s' = 23.184$) |

$f_M/r_A = f_M/r_3 = 0.61$, $f_M/r_B = f_M/r_{10} = 0.87$,
$-f_M/r_C = -f_M/r_{16} = 0.67$, $M/d_D = 0.59$

TABLE 24

$f_M = 45$ mm $\beta_M = 0$ FNo.$_M = 3.0$ $2\omega_M = 20°$ $f_S = 24.097$ mm
$\beta_S = -0.547$ eff.FNo.$_S = 3.0$ $\lambda = 632.8$ nm

| radius of curvature | axial distance | refractive index |
|---|---|---|
| $r_1$ (stop) | $d_1$ 20.009 | |
| $r_2$ −26.702 | $d_2$ 2.200 | $n_1$ 1.51508 |
| $r_3$ 80.897 | $d_3$ 8.200 | |
| $r_4$ −53.647 | $d_4$ 3.700 | $n_2$ 1.51508 |
| $r_5$ −39.484 | $d_5$ 0.300 | |
| $r_6$ 272.428 | $d_6$ 5.600 | $n_3$ 1.74969 |
| $r_7$ 53.135 | $d_7$ 11.300 | |
| $r_8$ 57.527 | $d_8$ 6.000 | $n_4$ 1.74969 |
| $r_9$ −985.416 | $d_9$ 7.500 | |
| $r_{10M}$ ∞ | | |
| $r_{10S}$ 125.000 | $d_{10}$ 4.000 | $n_5$ 1.51508 |
| $r_{11}$ ∞ | $d_{11}$ 4.500 | |
| $r_{12}$ 67.334 | $d_{12}$ 6.000 | $n_6$ 1.74969 |
| $r_{13}$ −234.412 | $d_{13}$ 5.800 | |
| $r_{14}$ −74.006 | $d_{14}$ 2.100 | $n_7$ 1.74969 |
| $r_{15}$ 30.225 | $d_{15}$ 2.300 | |
| $r_{16}$ 125.790 | $d_{16}$ 3.800 | $n_8$ 1.74969 |
| $r_{17}$ −74.812 | $d_{17}$ 2.766 | |
| $r_{18M}$ ∞ | | |
| $r_{18S}$ 20.500 | $d_{18}$ 4.000 | $n_9$ 1.80094 |
| $r_{19M}$ ∞ | | |
| $r_{19S}$ −50.000 | $d_{19}$ 0.531 | |
| $r_{20M}$ ∞ | | |
| $r_{20S}$ −25.500 | $d_{20}$ 2.850 | $n_{10}$ 1.80094 |
| $r_{21M}$ ∞ | | |
| $r_{21S}$ −50.000 | $\Sigma d$ 103.456 | ($s' = 17.858$) |

$f_M/r_A = f_M/r_3 = 0.56$, $f_M/r_B = f_M/r_8 = 0.78$,
$-f_M/r_C = -f_M/r_{14} = 0.61$, $f_M/d_D = 0.54$

TABLE 25

$f_M = 45$ mm $\beta_M = 0$ FNo.$_M = 3.0$ $2\omega_M = 20°$ $f_S = 23.626$ mm
$\beta_S = -0.579$ eff.FNo.$_S = 3.0$ $\lambda = 632.8$ nm

| radius of curvature | axial distance | refractive index |
|---|---|---|
| $r_1$ (stop) | $d_1$ 19.491 | |
| $r_2$ −26.626 | $d_2$ 2.100 | $n_1$ 1.51508 |
| $r_3$ 80.291 | $d_3$ 8.100 | |
| $r_4$ −53.762 | $d_4$ 3.800 | $n_2$ 1.51508 |
| $r_5$ −39.404 | $d_5$ 0.305 | |
| $r_6$ 274.080 | $d_6$ 5.007 | $n_3$ 1.74969 |
| $r_7$ −53.105 | $d_7$ 10.302 | |
| $r_8$ 57.356 | $d_8$ 6.198 | $n_4$ 1.74969 |
| $r_9$ −1001.091 | $d_9$ 7.500 | |
| $r_{10M}$ ∞ | | |
| $r_{10S}$ 127.517 | $d_{10}$ 4.000 | $n_5$ 1.51508 |
| $r_{11}$ ∞ | $d_{11}$ 4.500 | |
| $r_{12}$ 75.141 | $d_{12}$ 5.978 | $n_6$ 1.74969 |
| $r_{13}$ −187.074 | $d_{13}$ 5.979 | |
| $r_{14}$ −68.515 | $d_{14}$ 2.105 | $n_7$ 1.74969 |
| $r_{15}$ 31.055 | $d_{15}$ 2.351 | |
| $r_{16}$ 106.965 | $d_{16}$ 3.800 | $n_8$ 1.74969 |
| $r_{17}$ −74.073 | $d_{17}$ 2.500 | |
| $r_{18M}$ ∞ | | |
| $r_{18S}$ 16.975 | $d_{18}$ 4.000 | $n_9$ 1.80094 |
| $r_{19M}$ ∞ | | |
| $r_{19S}$ −105.637 | $d_{19}$ 0.800 | |
| $r_{20M}$ ∞ | | |
| $r_{20S}$ −39.334 | $d_{20}$ 3.000 | $n_{10}$ 1.80094 |
| $r_{21}$ ∞ | $\Sigma d$ 102.816 | ($s' = 17.766$) |

$f_M/r_A = f_M/r_3 = 0.56$, $_M/r_B = f_M/r_8 = 0.78$,
$-f_M/r_C = -f_M/r_{14} = 0.66$, $f_M/d_D = 0.54$

TABLE 26

$f_M = 45$ mm $\beta_M = 0$ FNo.$_M = 3.0$ $2\omega_M = 20°$ $f_S = 24.828$ mm
$\beta_S = -0.490$ eff.FNo.$_S = 3.0$ $\lambda = 632.8$ nm

| radius of curvature | axial distance | refractive index |
|---|---|---|
| $r_1$ (stop) | $d_1$ 21.602 | |
| $r_2$ −24.200 | $d_2$ 2.200 | $n_1$ 1.51508 |
| $r_3$ 93.855 | $d_3$ 8.100 | |
| $r_4$ −105.673 | $d_4$ 4.988 | $n_2$ 1.51508 |
| $r_5$ −46.500 | $d_5$ 0.361 | |
| $r_6$ 326.525 | $d_6$ 5.157 | $n_3$ 1.74969 |
| $r_7$ −46.263 | $d_7$ 10.281 | |

TABLE 26-continued $f_M = 45$ mm $\beta_M = 0$ FNo.$_M = 3.0$ $2\omega_M = 20°$ $f_S = 24.828$ mm
$\beta_S = -0.490$ eff.FNo.$_S = 3.0$ $\lambda = 632.8$ nm

| radius of curvature | axial distance | refractive index |
|---|---|---|
| $r_8$ 56.259 | $d_8$ 6.547 | $n_4$ 1.74969 |
| $r_9$ 174.901 | $d_9$ 11.448 | |
| $r_{10M}$ ∞ | | |
| $r_{10S}$ 83.243 | $d_{10}$ 4.000 | $n_5$ 1.51508 |
| $r_{11}$ ∞ | $d_{11}$ 2.000 | |
| $r_{12}$ 53.147 | $d_{12}$ 6.000 | $n_6$ 1.74969 |
| $r_{13}$ 147.022 | $d_{13}$ 6.571 | |
| $r_{14}$ ∞ | $d_{14}$ 3.150 | $n_7$ 1.74969 |
| $r_{15}$ 26.058 | $d_{15}$ 1.800 | |
| $r_{16}$ 51.722 | $d_{16}$ 3.200 | $n_8$ 1.74969 |
| $r_{17}$ −280.861 | $d_{17}$ 2.766 | |
| $r_{18M}$ ∞ | | |
| $r_{18S}$ 18.234 | $d_{18}$ 4.000 | $n_9$ 1.80094 |
| $r_{19M}$ ∞ | | |
| $r_{19S}$ −56.012 | $d_{19}$ 0.531 | |
| $r_{20M}$ ∞ | | |
| $r_{20S}$ −22.023 | $d_{20}$ 2.850 | $n_{10}$ 1.80094 |
| $r_{21M}$ ∞ | | |
| $r_{21S}$ −34.654 | $\Sigma d$ 107.552 | ($s' = 14.659$) |

$f_M/r_A = f_M/r_3 = 0.48$, $f_M/r_B = f_M/r_8 = 0.80$,
$-f_M/r_C = -f_M/r_{14} = 0$, $f_M/d_D = 0.52$

TABLE 27

$f_M = 45$ mm $\beta_M = 0$ FNo.$_M = 3.0$ $2\omega_M = 20°$ $f_S = 23.989$ mm
$\beta_S = -0.590$ eff.FNo.$_S = 3.0$ $\lambda = 632.8$ nm

| radius of curvature | axial distance | refractive index |
|---|---|---|
| $r_1$ (stop) | $d_1$ 17.104 | |
| $r_2$ −25.586 | $d_2$ 2.240 | $n_1$ 1.51508 |
| $r_3$ 65.820 | $d_3$ 6.200 | |
| $r_4$ −48.018 | $d_4$ 8.742 | $n_2$ 1.51508 |
| $r_5$ −35.283 | $d_5$ 0.011 | |
| $r_6$ 125.688 | $d_6$ 6.000 | $n_3$ 1.51508 |
| $r_7$ −47.370 | $d_7$ 9.074 | |
| $r_8$ 47.992 | $d_8$ 6.234 | $n_4$ 1.74969 |
| $r_9$ −347.814 | $d_9$ 11.032 | |
| $r_{10M}$ ∞ | | |
| $r_{10S}$ 106.886 | $d_{10}$ 4.000 | $n_5$ 1.51508 |
| $r_{11}$ ∞ | $d_{11}$ 3.000 | |
| $r_{12}$ 50.490 | $d_{12}$ 5.973 | $n_6$ 1.51508 |
| $r_{13}$ −270.366 | $d_{13}$ 1.350 | |
| $r_{14}$ −62.678 | $d_{14}$ 2.149 | $n_7$ 1.80094 |
| $r_{15}$ 30.587 | $d_{15}$ 5.974 | |
| $r_{16}$ 178.557 | $d_{16}$ 2.520 | $n_8$ 1.74969 |
| $r_{17}$ −57.946 | $d_{17}$ 2.766 | |
| $r_{18M}$ ∞ | | |
| $r_{18S}$ 21.693 | $d_{18}$ 4.000 | $n_9$ 1.80094 |
| $r_{19M}$ ∞ | | |
| $r_{19S}$ −48.315 | $d_{19}$ 0.531 | |
| $r_{20M}$ ∞ | | |
| $r_{20S}$ −28.375 | $d_{20}$ 2.850 | $n_{10}$ 1.80094 |
| $r_{21M}$ ∞ | | |
| $r_{21S}$ −73.462 | $\Sigma d$ 101.750 | ($s' = 19.382$) |

$f_M/r_A = f_M/r_3 = 0.68$, $f_M/r_B = f_M/r_8 = 0.94$,
$-f_M/r_C = -f_M/r_{14} = 0.72$, $f_M/d_D = 0.53$

TABLE 28

$f_M = 45$ mm $\beta_M = 0$ FNo.$_M = 3.0$ $2\omega_M = 20°$ $f_S = 31.421$ mm
$\beta_S = -0.445$ eff.FNo.$_S = 3.0$ $\lambda = 632.8$ nm

| radius of curvature | axial distance | refractive index |
|---|---|---|
| $r_1$ (stop) | $d_1$ 12.243 | |
| $r_2$ −27.049 | $d_2$ 2.251 | $n_1$ 1.51508 |
| $r_3$ 51.085 | $d_3$ 10.358 | |
| $r_4$ 219.397 | $d_4$ 5.331 | $n_2$ 1.51508 |
| $r_5$ −34.191 | $d_5$ 9.044 | |
| $r_6$ 65.589 | $d_6$ 6.799 | $n_3$ 1.51508 |
| $r_7$ −93.098 | $d_7$ 13.298 | |
| $r_{8M}$ ∞ | | |
| $r_{8S}$ 85.573 | $d_8$ 4.000 | $n_4$ 1.51508 |
| $r_9$ ∞ | $d_9$ 4.500 | |
| $r_{10}$ 45.100 | $d_{10}$ 10.800 | $n_5$ 1.80094 |
| $r_{11}$ −171.957 | $d_{11}$ 4.287 | |

TABLE 28-continued $f_M = 45$ mm $\beta_M = 0$ FNo.$_M = 3.0$ $2\omega_M = 20°$ $f_S = 31.421$ mm
$\beta_S = -0.445$ eff.FNo.$_S = 3.0$ $\lambda = 632.8$ nm

| radius of curvature | axial distance | refractive index |
|---|---|---|
| $r_{12}$ −69.243 | $d_{12}$ 12.314 | $n_6$ 1.80094 |
| $r_{13}$ 26.245 | $d_{13}$ 6.739 | |
| $r_{14}$ 68.183 | $d_{14}$ 2.700 | $n_7$ 1.80094 |
| $r_{15}$ −107.008 | $d_{15}$ 5.000 | |
| $r_{16M}$ ∞ | | |
| $r_{16S}$ 11.658 | $d_{16}$ 4.000 | $n_8$ 1.80094 |
| $r_{17M}$ ∞ | | |
| $r_{17S}$ −52.790 | $d_{17}$ 0.531 | |
| $r_{18M}$ ∞ | | |
| $r_{18S}$ −22.862 | $d_{18}$ 2.850 | $n_9$ 1.80094 |
| $r_{19M}$ ∞ | | |
| $r_{19S}$ −152.061 | $\Sigma d$ 117.054 | ($s' = 10.153$) |

$f_M/r_A = f_M/r_3 = 0.88$, $f_M/r_B = f_M/r_6 = 0.69$,
$-f_M/r_C = -f_M/r_{12} = 0.65$, $f_M/d_D = 0.43$

What is claimed is:

1. A telecentric fθ lens system for use in a laser COM comprising, from the object to image side:
    a first lens unit including a negative lens component;
    a second lens unit consisting of a positive lens component;
    a third lens unit including a positive lens component; and
    a fourth lens unit including three lens components, of which two lens components are a negative and a positive lens component aligned in order from the object side and the final lens component from the object side is positive, wherein said lens components are respectively spaced from each other on an optical axis.

2. A telecentric fθ lens system as claimed in claim 1 wherein the fourth lens unit includes a positive lens component, a negative lens component and a positive lens component in order from the object field side.

3. A telecentric fθ lens system as claimed in claim 1 further fulfilling the following conditions:
    $0 \leq f/r_A < 1$
    $0.6 < f/r_B < 1$
    $0 \leq -f/r_C < 1$
    $0.4 < f/d_D < 0.7$
wherein f is a total focal length of the lens system, $r_A$ is a radius of curvature of the image field side surface of the negative lens component in the first lens unit, $r_B$ is a radius of curvature of the object field side surface of the positive lens component in the third lens unit, $r_C$ is a radius of curvature of the object field side surface of the negative lens component in the fourth lens unit and $d_D$ is an axial distance of the whole lens system.

4. A telecentric fθ lens system as claimed in claim 1 further comprising a fifth lens unit of an anamorphic characteristic in which a refractive power thereof in the sagittal direction is larger than a refractive power in the meridional direction.

5. A telecentric fθ lens system as claimed in claim 1, wherein the fourth lens unit includes two positive lens components, a negative lens component and a positive lens component, in order from the object field side.

6. A telecentric fθ lens system for use in a laser COM comprising, from the object to the image side:
    a first lens unit including a negative lens component;
    a second lens unit consisting of a positive lens component;
    a third lens unit including a positive lens component;
    a fourth lens unit including three lens components; and a fifth lens unit of an anamorphic characteristic in which a refractive power thereof in the sagittal direction is larger than a refractive power in the meridional direction;

wherein one lens surface of the third lens unit is an anamorphic surface.

7. A telecentric fθ lens system as claimed in claim 6 wherein the fourth lens unit includes a positive lens component, a negative lens component and a positive lens component in order from the object field side.

8. A telecentric fθ lens system as claimed in claim 6 further fulfilling the following conditions:

$0 \leq f_M/r_A < 1$
$0.6 < f_M/r_B < 1$
$0 \leq -f_M/r_C < 1$
$0.4 < f_M/d_D < 0.7$ wherein $f_M$ is a total focal length of the lens system in the meridional direction, $r_A$ is a radius of curvature of the image field side surface of the negative lens in the first lens component unit, $r_B$ is a radius of curvature of the object field side surface of the positive lens component in the third lens unit, $r_C$ is a radius of curvature of the object field side surface of the negative lens component in the fourth lens unit and $d_D$ is an axial distance of the whole lens system.

9. A telecentric fθ lens system as claimed in claim 6, further fulfilling the following conditions:

$0 \leq f_M/r_A < 1$
$0.6 < f_M/r_B < 1$
$0 \leq -f_M/r_C < 1$
$0.4 < f_M/d_D < 0.6$ wherein $f_M$ is a total focal length of the lens system in the meridional direction, $r_A$ is a radius of curvature of the image field side surface of the negative lens component in the first lens unit, $r_B$ is a radius of curvature of the object field side surface of the positive lens component in the third lens unit, $r_C$ is a radius of curvature of the object field side surface of the negative lens component in the fourth lens unit, and $d_D$ is an axial distance of the whole lens system.

10. A telecentric fθ lens system as claimed in claim 6, further fulfilling the following conditions:

$f_S < f_M$
$0.4 < -\beta_S < 0.8$ wherein:

$f_S$ = a total focal length of the lens system in the sagittal direction,
$f_M$ = a total focal length of the lens system in the meridional direction,
$\beta_S$ = a magnification in the sagittal direction.

11. A telecentric fθ lens system for use in a laser COM comprising, from the object to the image side:
a first lens unit including a negative lens component;
a second lens unit consisting of two positive lens components;
a third lens unit including a positive lens component, and
a fourth lens unit including three lens components, of which two lens components are a negative and a positive lens component aligned in order from the object side and the final lens component from the object side is positive, wherein said lens components are respectively spaced from each other on an optical axis.

12. A telecentric fθ lens system as claimed in claim 11, wherein the fourth lens unit includes a positive lens component, a negative lens component and a positive lens component in order from the object field side.

13. A telecentric fθ lens system as claimed in claim 11, wherein the fourth lens unit includes two positive lens components, a negative lens component and a positive lens component in order from the object field side.

14. A telecentric fθ lens system as claimed in claim 11, further fulfilling the following conditions:

$0 \leq f/r_A < 1$
$0.6 < f/r_B < 1$
$0 \leq -f/r_C < 1$
$0.4 < f/d_D < 0.7$ wherein f is a total focal length of the lens system, $r_A$ is a radius of curvature of the image field side surface of the negative lens component in the first lens unit, $r_B$ is a radius of curvature of the object field side surface of the positive lens component in the third lens unit, $r_C$ is a radius of curvature of the object field side surface of the negative lens component in the fourth lens unit, and $d_D$ is an axial distance of the whole lens system.

15. A telecentric fθ lens system as claimed in claim 11, further comprising a fifth lens unit of an anamorphic characteristic in which a refractive power thereof in the sagittal direction is larger than a refractive power in the meridional direction.

16. A telecentric fθ lens system for use in a laser COM comprising, from the object to the image side:
a first lens unit including a negative lens component;
a second lens unit consisting of a positive lens component;
a third lens unit including a positive lens component;
a fourth lens unit including three lens components, and
a fifth lens unit of an anamorphic characteristic in which a refractive power thereof in the sagittal direction is larger than a refractive power in the meridional direction,
wherein one lens surface of the fourth lens unit is an anamorphic surface.

17. A telecentric fθ lens system as claimed in claim 16, wherein the fourth lens unit includes a positive lens component, a negative lens component and a positive lens component in order from the object field side.

18. A telecentric fθ lens system as claimed in claim 16, wherein the fourth lens unit includes two positive lens components, a negative lens component and a positive lens component in order from the object field side.

19. A telecentric fθ lens system as claimed in claim 16, further fulfilling the following conditions:

$0 \leq f_M/r_A < 1$
$0.6 < f_M/r_B < 1$
$0 \leq -f_M/r_C < 1$
$0.4 < f_M/d_D < 0.7$ wherein $f_M$ is a total focal length of the lens system in the meridional direction, $r_A$ is a radius of curvature of the image field side surface of the negative lens component in the first lens unit, $r_B$ is a radius of curvature of the object field side surface of the positive lens component in the third lens unit, $r_C$ is a radius of curvature of the object field side surface of the negative lens component in the fourth lens unit, and $d_D$ is an axial distance of the whole lens system.

20. A telecentric fθ lens system as claimed in claim 16, further fulfilling the following conditions:

$0 \leq f_M/r_A < 1$
$0.6 < f_M/r_B < 1$ $0 \leq -f_M/r_C < 1$ $0.4 < f_M/d_D < 0.6$ wherein $f_M$ is a total focal length of the lens system in the meridional direction, $r_A$ is a radius of curvature of the image field side surface of the negative lens component in the first lens unit, $r_B$ is a radius of curvature of the object field side surface of the positive lens component in the third lens unit, $r_C$ is a radius of curvature of the object field side surface of the negative lens component in the fourth lens unit, and $d_D$ is an axial distance of the whole lens system.

21. A telecentric fθ lens system as claimed in claim 16, further fulfilling the following conditions:

$f_s < f_M$ $0.4 < -\beta_s < 0.8$ wherein:

$f_s$ = a total focal length of the lens system in the sagittal direction, $f_M$ = a total focal length of the lens system in the meridional direction, and $\beta_s$ = a magnification in the sagittal direction.

22. A telecentric fθ lens system for use in a laser COM comprising, from the object to the image side:

a first lens unit including a negative lens component;

a second lens unit consisting of two positive lens components;

a third lens unit including a positive lens component;

a fourth lens unit including three lens components, and a fifth lens unit of an anamorphic characteristic in which a refractive power thereof in the sagittal direction is larger than a refractive power in the meridional direction, wherein one lens surface of the third lens unit is an anamorphic surface.

23. A telecentric fθ lens system as claimed in claim 22, wherein the fourth lens unit includes a positive lens component, a negative lens component and a positive lens component in order from the object field side.

24. A telecentric fθ lens system as claimed in claim 22, wherein the fourth lens unit includes two positive lens components, a negative lens component and a positive lens component in order from the object field side.

25. A telecentric fθ lens system as claimed in claim 22, further fulfilling the following conditions:

$0 \leq f_M/r_A < 1$ $0.6 < f_M/r_B < 1$ $0 \leq -f_M/r_C < 1$ $0.4 < f_M/d_D < 0.7$ wherein $f_M$ is a total focal length of the lens system in the meridional direction, $r_A$ is a radius of curvature of the image field side surface of the negative lens component in the first lens unit, $r_B$ is a radius of curvature of the object field side surface of the positive lens component in the third lens unit, $r_C$ is a radius of curvature of the object field side surface of the negative lens component in the fourth lens unit, and $d_D$ is an axial distance of the whole lens system.

26. A telecentric fθ lens system as claimed in claim 22, further fulfilling the following conditions:

$0 \leq f_M/r_A < 1$ $0.6 < f_M/r_B < 1$ $0 \leq -f_M/r_C < 1$ $0.4 < f_M/d_D < 0.6$ wherein $f_M$ is a total focal length of the lens system in the meridional direction, $r_A$ is a radius of curvature of the image field side surface of the negative lens component in the first lens unit, $r_B$ is a radius of curvature of the object field side surface of the positive lens component in the third lens unit, $r_C$ is a radius of curvature of the object field side surface of the negative lens component in the fourth lens unit, and $d_D$ is an axial distance of the whole lens system.

27. A telecentric fθ lens system as claimed in claim 22, further fulfilling the following conditions:

$f_s < f_M$ $0.4 < -\beta_s < 0.8$ wherein:

$f_s$ = a total focal length of the lens system in the sagittal direction, $f_M$ = a total focal length of the lens system in the meridional direction, and $\beta_s$ = a magnification in the sagittal direction.

28. A telecentric fθ lens system for use in a laser COM comprising, from the object to the image side:

a first lens unit including a negative lens component;

a second lens unit consisting of two positive lens components;

a third lens unit including a positive lens component;

a fourth lens unit including three lens components, and a fifth lens unit of an anamorphic characteristic in which a refractive power thereof in the sagittal direction is larger than a refractive power in the meridional direction, wherein one lens surface of the fourth lens unit is an anamorphic surface.

29. A telecentric fθ lens system as claimed in claim 28, wherein the fourth lens unit includes a positive lens component, a negative lens component and a positive lens component in order from the object field side.

30. A telecentric fθ lens system as claimed in claim 28, wherein the fourth lens unit includes two positive lens components, a negative lens component and a positive lens component in order from the object field side.

31. A telecentric fθ lens system as claimed in claim 28, further fulfilling the following conditions:

$0 \leq f_M/r_A < 1$ $0.6 < f_M/r_B < 1$ $0 \leq -f_M/r_C < 1$ $0.4 < f_M/d_D < 0.7$ wherein $f_M$ is a total focal length of the lens system in the meridional direction, $r_A$ is a radius of curvature of the image field side surface of the negative lens component in the first lens unit, $r_B$ is a radius of curvature of the object field side surface of the positive lens component in the third lens unit, $r_C$ is a radius of curvature of the object field side surface of the negative lens component in the fourth lens unit, and $d_D$ is an axial distance of the whole lens system.

32. A telecentric fθ lens system as claimed in claim 28, further fulfilling the following conditions:

$0 \leq f_M/r_A < 1$ $0.6 < f_M/r_B < 1$ $0 \leq -f_M/r_C < 1$ $0.4 < f_M/d_D < 0.6$ wherein $f_M$ is a total focal length of the lens system in the meridional direction, $r_A$ is a radius of curvature of the image field side surface of the negative lens component in the first lens unit, $r_B$ is a radius of curvature of the object field side surface of the positive lens component in the third lens unit, $r_C$ is a radius of curvature of the object field side surface of the negative lens component in the fourth lens unit, and $d_D$ is an axial distance of the whole lens system.

33. A telecentric f$\theta$ lens system as claimed in claim 28, further fulfilling the following conditions:

$f_s < f_M$
$0.4 < -\beta_s < 0.8$ wherein:
 $f_s$ = a total focal length of the lens system in the sagittal direction,
 $f_M$ = a total focal length of the lens system in the meridional direction, and
 $\beta_s$ = a magnification in the sagittal direction.

* * * * *